US008810623B2

(12) United States Patent
Mizutani

(10) Patent No.: US 8,810,623 B2
(45) Date of Patent: Aug. 19, 2014

(54) OPTICAL SCANNING DEVICE AND IMAGE FORMING APPARATUS

(71) Applicant: KYOCERA Document Solutions Inc., Osaka (JP)

(72) Inventor: Hideji Mizutani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/125,603

(22) PCT Filed: Feb. 21, 2013

(86) PCT No.: PCT/JP2013/000997
§ 371 (c)(1),
(2), (4) Date: Dec. 12, 2013

(87) PCT Pub. No.: WO2013/125233
PCT Pub. Date: Aug. 29, 2013

(65) Prior Publication Data
US 2014/0126923 A1 May 8, 2014

(30) Foreign Application Priority Data

Feb. 22, 2012 (JP) ................................. 2012-036026
Feb. 22, 2012 (JP) ................................. 2012-036027

(51) Int. Cl.
| | |
|---|---|
| B41J 27/00 | (2006.01) |
| B41J 2/435 | (2006.01) |
| G02B 26/02 | (2006.01) |
| G03G 15/043 | (2006.01) |
| H04N 1/113 | (2006.01) |
| G02B 26/08 | (2006.01) |
| G02B 26/10 | (2006.01) |

(52) U.S. Cl.
CPC .............. *G02B 26/10* (2013.01); *G03G 15/043* (2013.01); *H04N 1/113* (2013.01); *G02B 26/0833* (2013.01); *G02B 26/105* (2013.01)
USPC ........... 347/260; 347/259; 347/236; 347/237; 347/246; 347/247; 359/223.1

(58) Field of Classification Search
USPC ................. 347/236, 237, 246, 247, 259, 260; 359/223.1
See application file for complete search history.

(56) References Cited

U.S. PATENT DOCUMENTS

| | | | |
|---|---|---|---|
| 2005/0219674 A1 | 10/2005 | Asai et al. | |
| 2008/0273230 A1 | 11/2008 | Kadowaki | |
| 2009/0051992 A1 | 2/2009 | Fujii et al. | |
| 2010/0103493 A1* | 4/2010 | Ide et al. ..................... | 359/223.1 |
| 2011/0064470 A1 | 3/2011 | Akiyama et al. | |
| 2011/0101202 A1 | 5/2011 | Mizutani | |

FOREIGN PATENT DOCUMENTS

| | | |
|---|---|---|
| JP | 2004-177543 | 6/2004 |
| JP | 2005-292627 | 10/2005 |
| JP | 2008-40460 | 2/2008 |

(Continued)

OTHER PUBLICATIONS

Written Opinion and International Search Report dated May 21, 2013.

*Primary Examiner* — Sarah Al Hashimi
(74) *Attorney, Agent, or Firm* — Gerald E. Hespos; Michael J. Porco; Matthew T. Hespos

(57) ABSTRACT

An optical scanning device includes a MEMS mirror, a driving unit for oscillating the MEMS mirror using a drive voltage which varies in a basic cycle, a light detection unit for receiving laser light deflected by the MEMS mirror and outputting a detection signal, a correction value calculation unit for calculating a correction voltage value used in correcting the drive voltage, a DC voltage generation unit for generating a DC voltage having a voltage value smaller than the correction voltage value, a DC voltage amplification unit for amplifying the DC voltage generated by the DC voltage generation unit to have a voltage value equal to the correction voltage value, and a waveform shaping unit for shaping the waveform of the amplified DC voltage so that the DC voltage varies in the basic cycle and outputting the shaped DC voltage as the drive voltage to the driving unit.

18 Claims, 26 Drawing Sheets

(56) References Cited

FOREIGN PATENT DOCUMENTS

| | | |
|---|---|---|
| JP | 2008-275757 | 11/2008 |
| JP | 2009-276481 | 11/2009 |
| JP | 2011-95561 | 5/2011 |
| JP | 2011-170240 | 9/2011 |

* cited by examiner

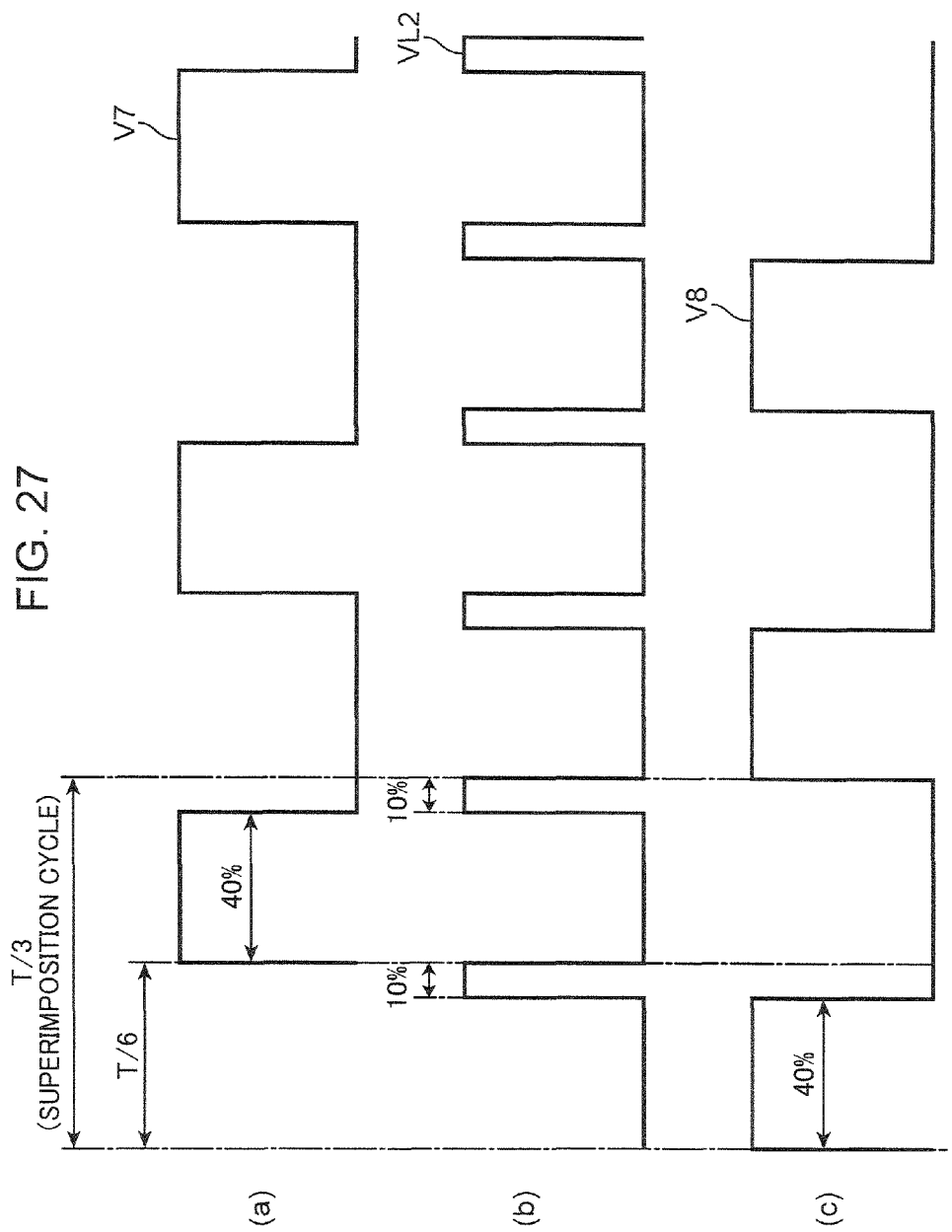

OPTICAL SCANNING DEVICE AND IMAGE FORMING APPARATUS

TECHNICAL FIELD

The present invention relates to an optical scanning device with a MEMS mirror for deflecting scanning laser light and an image forming apparatus including the same.

BACKGROUND ART

Conventionally, a Micro Electro Mechanical Systems (MEMS) mirror which reciprocally oscillates is known as a reflecting mirror for deflecting scanning laser light toward a photoconductor (see, for example, Japanese Unexamined Patent Publication No. 2004-177543). In FIG. 3 of Japanese Unexamined Patent Publication No. 2004-177543, a MEMS mirror is denoted by 8 and piezoelectric bodies as drive sources for oscillating the MEMS mirror 8 are denoted by a, b, c and d. The drive sources a, b are driven in the same phase and the drive sources c, d are driven in a phase opposite to the drive sources a, b, whereby the MEMS mirror 8 undergoes torsional oscillation. In this way, scanning is performed by reflecting and deflecting laser light incident on the MEMS mirror 8.

Further, a block diagram of a drive circuit for driving the drive sources a, b, c and d is shown in FIG. 2 of Japanese Unexamined Patent Publication No. 2004-177543. In this FIG. 2 of Japanese Unexamined Patent Publication No. 2004-177543, a sine wave is generated in an oscillator 121$a$ and that sine wave is input to a phase inversion circuit 121$b$ and a phase shifter 121$c$. In the phase shifter 121$c$, a signal which is so adjusted that an image signal corresponds to the phase of the MEMS mirror 8 is generated. This signal is voltage amplified by an amplifier 121$e$ and supplied to the drive sources a, b. Further, the sine wave generated in the oscillator 121$a$ has the phase inverted through the phase inversion circuit 121$c$ and is supplied to the drive sources c, d by way of the phase shifter 121$d$ and an amplifier 121$f$.

Further, Japanese Unexamined Patent Publication No. 2008-40460 discloses a technique for configuring a driving unit for a mirror as one electromagnetic actuator with a coil and a permanent magnet and oscillating a mirror by torque acting on the permanent mirror when a current flows in the coil. Also in this technique, after a sine wave is generated in an arbitrary waveform generator, that sine wave is amplified by an amplifier as in the above Japanese Unexamined Patent Publication No. 2004-177543.

Japanese Unexamined Patent Publication No. 2008-40460 also discloses a technique for correcting a displacement angle (deflection angle) of a mirror which changes due to an environmental change and a change over time. In this correction technique, a light receiving element for receiving scanning light deflected by the mirror is arranged at a predetermined position, an output of this light receiving element is taken in and the phase and amplitude of a sine wave generated in the arbitrary waveform generator are so adjusted that the scanning light passes through the light receiving element at a desired timing.

However, the oscillator capable of generating a sine wave and the amplifier capable of accurately amplifying a sine wave, which are disclosed in Japanese Unexamined Patent Publication No. 2004-177543 and Japanese Unexamined Patent Publication No. 2008-40460, are expensive. Particularly, the oscillator capable of generating a sine wave by changing a phase and an amplitude as disclosed in is even more expensive. Thus, there has been a room for improvement in terms of cost in configuring an optical scanning device and an image forming apparatus including a MEMS mirror and capable of correcting a drive voltage for driving the MEMS mirror to compensate for a change in the deflection angle of the MEMS mirror.

SUMMARY OF INVENTION

An object of the present invention is to inexpensively provide an optical scanning device which corrects a drive voltage for a MEMS mirror for deflecting scanning laser light to compensate for a change in a deflection angle of the MEMS mirror and an image forming apparatus including the same.

An optical scanning device according to one aspect of the present invention includes a light source, a MEMS mirror for deflecting laser light output from the light source, a driving unit for pivoting the MEMS mirror using a drive voltage which varies in a predetermined basic cycle, a light detection unit for receiving the laser light deflected by the MEMS mirror at a predetermined position and outputting a detection signal indicating light reception, a correction value calculation unit for calculating a correction voltage value, which is a voltage value used in correcting the drive voltage to compensate for a change in a deflection angle of the MEMS mirror, based on an output timing of the detection signal by the light detection unit, a DC voltage generation unit for generating a DC voltage having a voltage value smaller than the correction voltage value, a DC voltage amplification unit for amplifying the DC voltage generated by the DC voltage generation unit to have a voltage value equal to the correction voltage value, and a waveform shaping unit for shaping the waveform of the DC voltage amplified by the DC voltage amplification unit so that the DC voltage varies in the basic cycle and outputting the shaped DC voltage as the drive voltage to the driving unit.

According to this configuration, a DC voltage having a voltage value smaller than the correction voltage value is generated by the DC voltage generation unit and the generated DC voltage is amplified to have a voltage value equal to the correction voltage value by the DC voltage amplification unit. Then, the waveform of the amplified DC voltage is shaped by the waveform shaping unit so that the DC voltage varies in the predetermined basic cycle and an AC voltage which varies in the basic cycle is output as a drive voltage to the driving unit.

That is, the MEMS mirror can be driven using the DC voltage generation unit and the DC voltage amplification unit, which are simple and inexpensive, without providing an oscillator capable of generating a sine wave by changing a phase and an amplitude and an amplifier capable of precisely amplifying the sine wave, and a drive voltage for driving the MEMS mirror can be corrected to compensate for a change in the deflection angle of the MEMS mirror. As a result, it is possible to inexpensively provide an optical scanning device for correcting a drive voltage for driving a MEMS mirror for deflecting scanning laser light to compensate for a change in a deflection angle of the MEMS mirror.

An image forming apparatus according to another aspect of the present invention includes the optical scanning device and an image forming unit including a photoconductor on which a latent image is to be formed by the optical scanning device and configured to form an image corresponding to the latent image on a sheet.

An object, features and advantages of the present invention will become more apparent upon reading the following detailed description along with the accompanying drawings.

DESCRIPTION OF EMBODIMENTS

Figure 1:
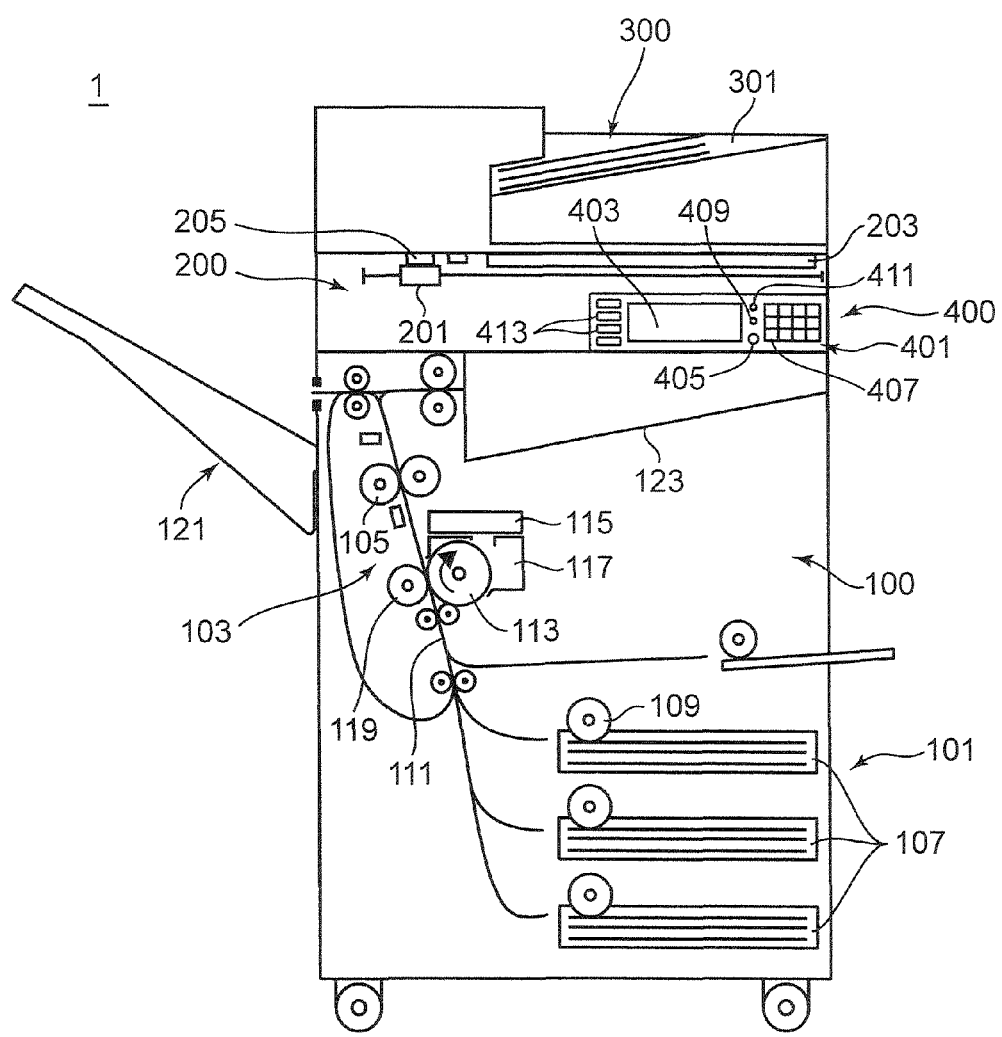
FIG. 1 is a schematic sectional view showing a multi-function peripheral as an example of an image forming apparatus to which an optical scanning device according to the present invention is applied.

FIG. 1 is a schematic sectional view of a multi-function peripheral (image forming apparatus) to which an optical scanning device according to the present invention is applied. The multi-function peripheral 1 combines a plurality of functions of, for example, a copier, a printer, a scanner and the like. The multi-function peripheral 1 includes a main body unit 100, a document reading unit 200 arranged atop the main body unit 100, a document feeding unit 300 arranged atop the document reading unit 200 and an operation unit 400 arranged on an upper part of the front surface of the main body unit 100.

The document feeding unit 300 functions as an automatic document feeder and can successively feed a plurality of documents placed on a document placing portion 301 to the document reading unit 200.

The document reading unit 200 includes a carriage 201 carrying a Charge Coupled Device (CCD) sensor, a Light Emitting Diode (LED) and the like, a document platen 203 made of a transparent material such as glass and a document reading slit 205. In the case of reading a document placed on the document platen 203, the document is read by the CCD sensor while the carriage 201 is moved in a longitudinal direction of the document platen 203. Contrary to this, in the case of reading a document fed from the document feeding unit 300, the document fed from the document feeding unit 300 is read by the CCD sensor through the document reading slit 205 by moving the carriage 201 to a position facing the document reading slit 205. The CCD sensor outputs the read document as image data.

The main body unit 100 includes a sheet storage unit 101, an image forming unit 103 and a fixing unit 105. The sheet storage unit 101 includes sheet trays 107 capable of storing a stack of sheets. The uppermost sheet of the stack of sheets stored in the sheet tray 107 is picked up toward a sheet conveying unit 111 by driving a pickup roller 109. The sheet is conveyed to the image forming unit 103 through the sheet conveying unit 111.

The image forming unit 103 forms a toner image on a sheet conveyed thereto based on image data. The image forming unit 103 includes a photoconductive drum 113 (photoconductor on which a latent image is to be formed), an exposure unit (optical scanning device) 115, a developing unit 117 and a transfer unit 119. The exposure unit 115 generates light corresponding to image data (image data output from the document reading unit 200, image data transmitted from a personal computer, facsimile received image data or the like) and irradiates it to the uniformly charged circumferential surface of the photoconductive drum 113. This causes an electrostatic latent image corresponding to the image data to be formed on the circumferential surface of the photoconductive drum 113. Toner is supplied from the developing unit 117 to the circumferential surface of the photoconductive drum 113 in this state, whereby a toner image corresponding to the electrostatic latent image is formed on the circumferential surface. This toner image is transferred to a sheet conveyed from the sheet storage unit 101 by the transfer unit 119.

The sheet having the toner image transferred thereto is fed to the fixing unit 105. The fixing unit 105 fixes the toner image to the sheet by applying heat and pressure to the toner image and the sheet. The sheet after a fixing process is discharged to a stack tray 121 or a discharge tray 123.

The operation unit 400 includes a display unit 403 and an operation key unit 401. The display unit 403 has a touch panel function and a screen including soft keys is displayed thereon. A user enters the input of settings necessary to execute a function such as a copy function by operating the soft keys while viewing the screen.

The operation key unit 401 includes operation keys which are hard keys, specifically a start key 405, a numerical keypad 407, a stop key 409, a reset key 411, function switch keys 413 for switching copy, printer, scanner and facsimile functions from one to another, and the like.

The start key 405 is a key for starting a copying operation, a facsimile transmission and the like. The numerical keypad 407 includes keys for entering numbers such as the number of print copies and facsimile numbers. The stop key 409 is a key for stopping a copying operation or the like halfway. The reset key 411 is a key for resetting the set content to an initially set state.

The function switch keys 413 include a copy key, a transmit key and the like and are keys for switching the copy function, the transmit function and the like from one to another. If the copy key is operated, an initial screen for copy is displayed on the display unit 403. If the transmit key is operated, an initial screen for facsimile transmission and mail transmission is displayed on the display unit 403.

Figure 2:
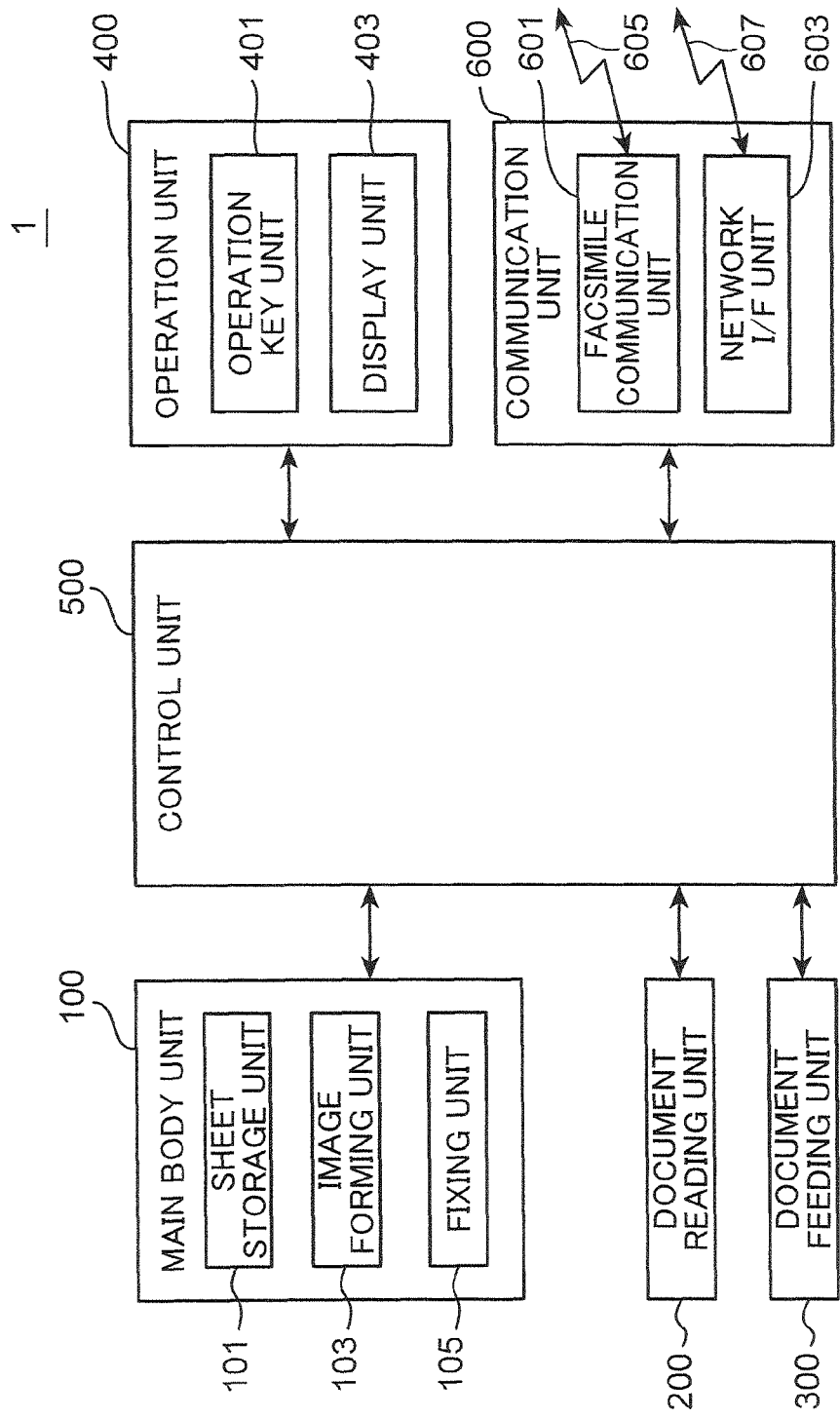
FIG. 2 is a block diagram showing an example of the electrical configuration of the multi-function peripheral.

FIG. 2 is a block diagram showing the electrical configuration of the multi-function peripheral 1. The multi-function peripheral 1 is so configured that functional units such as the main body unit 100, the document reading unit 200, the document feeding unit 300, the operation unit 400, a communication unit 600 and a control unit 500 are mutually communicably connected. The main body unit 100, the document reading unit 200, the document feeding unit 300 and the operation unit 400 are not described since they are already described.

The communication unit 600 includes a facsimile communication unit 601 and a network I/F unit 603. The facsimile communication unit 601 includes an NCU (Network Control Unit) for controlling the connection of a telephone line to a destination facsimile machine and a modulation/demodulation circuit for modulating and demodulating a signal for facsimile communication. The facsimile communication unit 601 is connected to a telephone line 605.

The network I/F unit 603 is connected to a Local Area Network (LAN) 607. The network I/F unit 603 is a communication interface circuit for carrying out a communication with terminal units such as personal computers connected to the LAN 607.

The control unit 500 includes, for example, a Central Processing Unit (CPU), a Read Only Memory (ROM), a Random Access Memory (RAM), an image memory and the like. The CPU performs a control necessary to operate the multi-function peripheral 1 on the above constituent elements of the multi-function peripheral 1 such as the main body unit 100. The ROM stores software and set values necessary to control the operation of the multi-function peripheral 1. The RAM is utilized as a temporary memory for data generated when the software is executed. The image memory temporarily stores image data (image data output from the document reading unit 200, image data transmitted from a personal computer, facsimile received image data or the like).

<First Embodiment>

Figure 3:
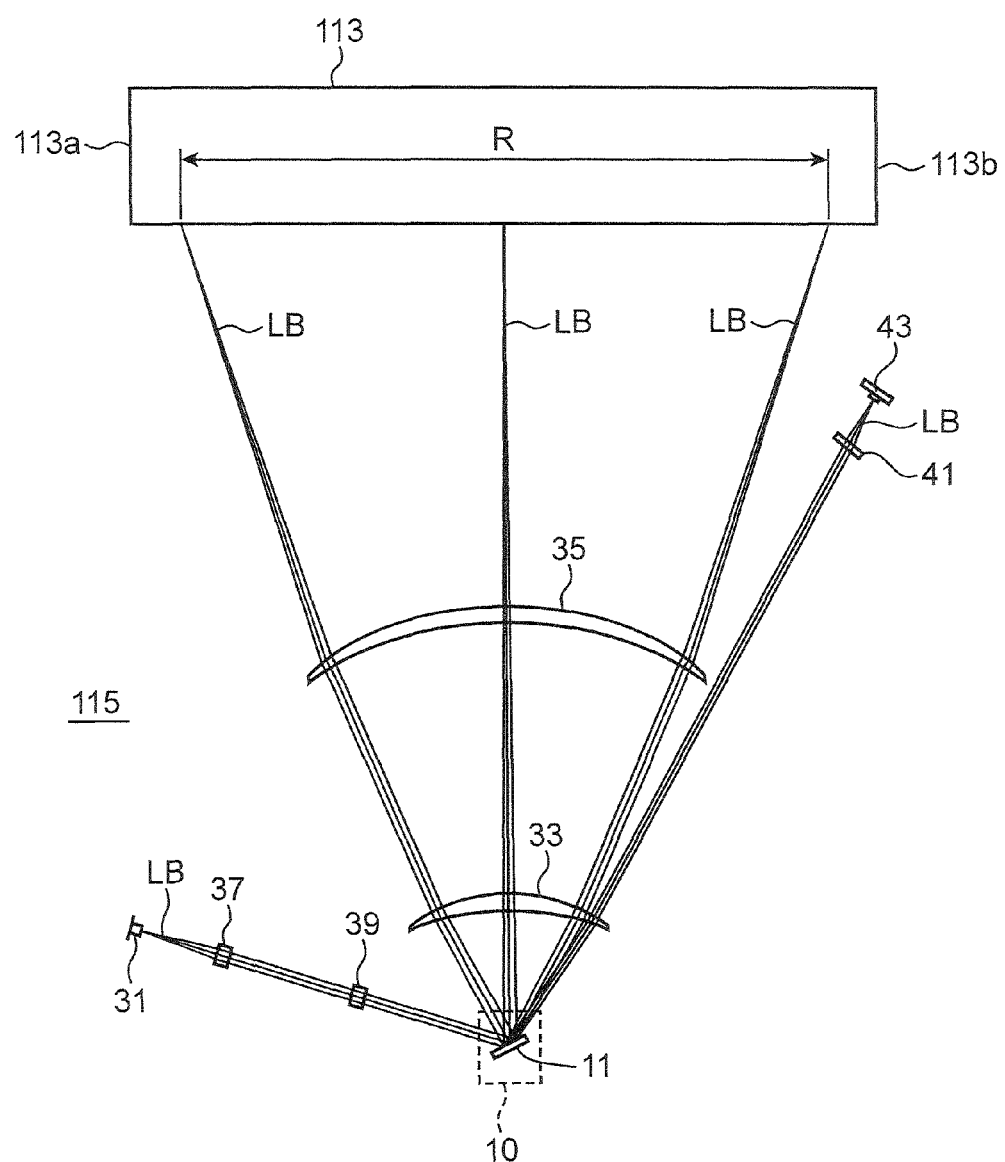
FIG. 3 is a diagram showing an arrangement relationship of optical components configuring an exposure unit according to a first embodiment of the present invention.

FIG. 3 is a diagram showing an arrangement relationship of optical components configuring the exposure unit 115 according to the first embodiment. The exposure unit 115 includes a light source 31, a light deflection unit 10, two scanning lenses 33, 35 and the like. The light source 31 is, for example, a laser diode and irradiates a light beam (laser light) LB modulated in correspondence with image data.

A collimator lens 37 and a cylindrical lens 39 are arranged on an optical path between the light source 31 and the light deflection unit 10. The collimator lens 37 converts the light beam LB irradiated from the light source 31 into parallel light. The cylindrical lens 39 linearly condenses the light beam LB collimated into parallel light. The linearly condensed light beam LB is incident on the light deflection unit 10.

The scanning lenses 33, 35 are arranged on an optical path between the light deflection unit 10 and the photoconductive drum 113. The light beam LB incident on a mirror portion 11 of the light deflection unit 10 is reflected and deflected by the mirror portion 11 and focused on the circumferential surface of the photoconductive drum 113 by the scanning lenses 33, 35. Specifically, an electrostatic latent image is formed on the circumferential surface of the photoconductive drum 113 by scanning the circumferential surface of the photoconductive drum 113 with the light beam LB.

The exposure unit 115 further includes a Beam Detect (BD) lens 41 and a BD sensor (light detection unit) 43. The BD sensor 43 is arranged at a specified position (predetermined position) in a housing (not shown) of the exposure unit 115 and receives the light beam LB deflected by the light deflection unit 10. Specifically, in the case of scanning the light beam LB across the photoconductive drum 113 from one lateral portion 113a to the other lateral portion 113b of the photoconductive drum 113, the light beam LB beyond an effective scanning range R is condensed by the BD lens 41 and received by the BD sensor 43. The BD sensor 43 outputs a detection signal indicating light reception when receiving the light beam LB beyond the effective scanning range R. The detection signal output from the BD sensor 43 is utilized to synchronize an image signal indicating an electrostatic latent image to be formed on the photoconductive drum 113 and a timing for scanning the effective scanning range R.

Figure 4:
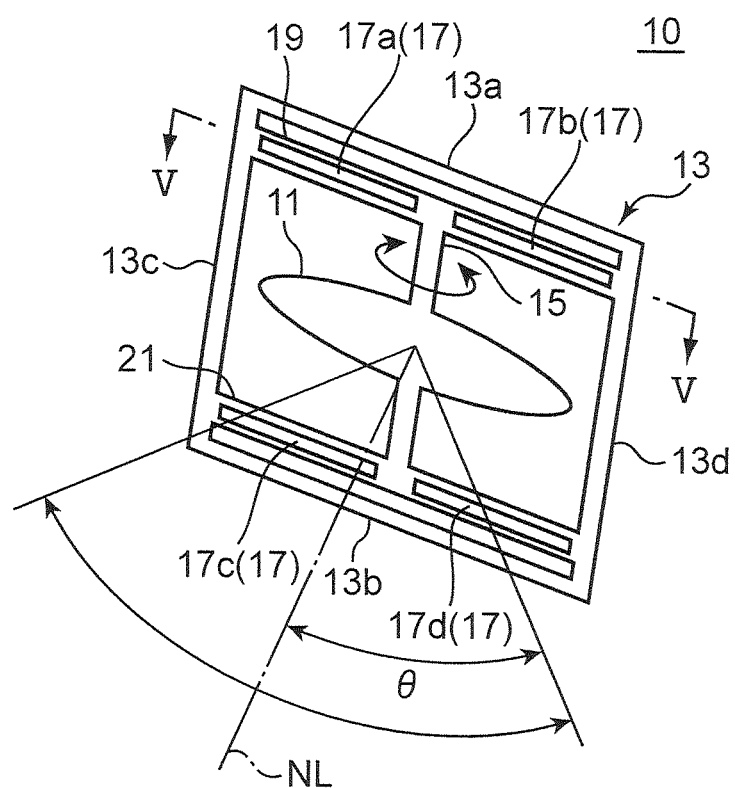
FIG. 4 is a diagram showing the principle of a light deflection unit according to the first embodiment.
Figure 5:
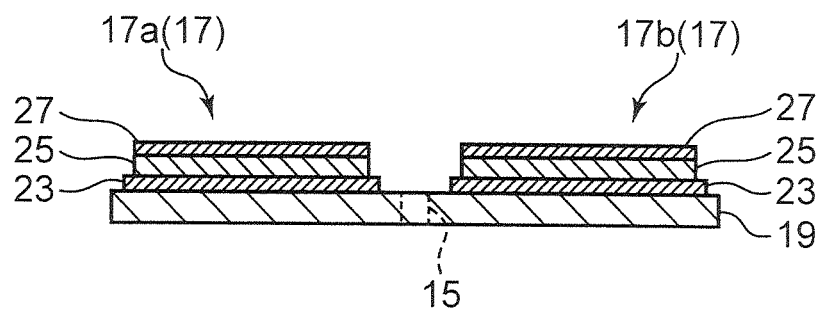
FIG. 5 is a sectional view cut along line V-V of the light deflection unit shown in FIG. 4.

The light deflection unit 10 is described. FIG. 4 is a diagram showing the principle of the light deflection unit 10. FIG. 5 is a sectional view cut along line V-V of the light deflection unit 10 shown in FIG. 4.

The light deflection unit 10 includes the mirror portion (MEMS mirror) 11, a frame 13, a torsion bar 15 and mirror driving units (driving unit) 17a, 17b, 17c and 17d. The mirror portion 11 deflects the light beam LB output from the light source 31. The mirror driving units 17a to 17d pivot the mirror portion 11 using drive voltages which vary in a predetermined basic cycle.

The frame 13 has a rectangular shape. The frame 13 is configured by a pair of side portions 13a, 13b extending in a longitudinal direction and a pair of side portions 13c, 13d extending in a direction perpendicular to the longitudinal direction. The mirror portion 11 is arranged in a central part of the frame 13. The mirror portion 11 has an elliptical shape. An ellipse major axis direction is the longitudinal direction of the frame 13. A light beam is incident on the mirror portion 11 and reflected and deflected by the mirror portion 11.

The torsion bar 15 extends in an ellipse minor axis direction of the mirror portion 11 and the mirror portion 11 is fixed to the torsion bar 15. One end of the torsion bar 15 is supported by a beam 19. The other end of the torsion bar 15 is supported by a beam 21. The beams 19, 21 are members parallel to the pair of side portions 13a, 13b and end parts thereof are respectively supported by the pair of side portions 13c, 13d.

On the beam 19, the mirror driving unit 17a is formed on a side closer to the side portion 13c than the torsion bar 15 and the mirror driving unit 17b is formed on a side closer to the side portion 13d than the torsion bar 15. On the beam 21, the mirror driving unit 17c is formed on a side closer to the side portion 13c than the torsion bar 15 and the mirror driving unit 17d is formed on a side closer to the side portion 13d than the torsion bar 15.

As shown in FIG. 5, the mirror driving unit 17a is composed of a lower electrode 23, a PZT thin film 25 and an upper electrode 27. The mirror driving units 17b, 17c and 17d have the same configuration as the mirror driving unit 17a. Unless it is necessary to distinguish, the mirror driving units 17a, 17b, 17c and 17d are written as the mirror driving units 17 below. AC voltages which vary in a predetermined fixed basic cycle are applied as drive voltages to the mirror driving units 17. In this way, the beams 19, 21 are deflected, thereby inclining the mirror portion 11 together with the torsion bar 15.

Figure 6:
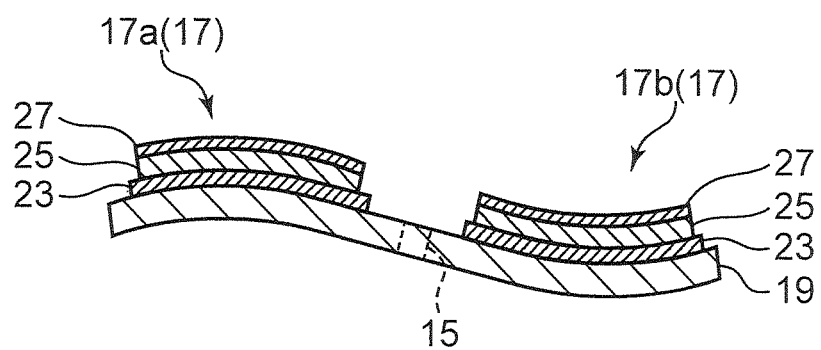
FIG. 6 is a view showing a state where a PZT thin film of a mirror driving unit on one side extends and a PZT thin film of a mirror driving unit on the other side contracts on the same cross-section as in FIG. 5.

FIG. 6 is a view showing a state where drive voltages are so applied to the mirror driving units 17 that the PZT thin film 25 of the mirror driving unit 17a, 17c (first driving unit) extends and the PZT thin film 25 of the mirror driving unit 17b, 17d (second driving unit) contracts on the same cross-section as in FIG. 5. An inclining movement of the torsion bar 15 due to the extension of the PZT thin films 25 of the mirror driving units 17a, 17c and the contraction of the PZT thin films 25 of the mirror driving units 17b, 17d in this way is called a first movement. Conversely, an inclining movement of the torsion bar 15 due to the contraction of the PZT thin films 25 of the mirror driving units 17a, 17c and the extension of the PZT thin films 25 of the mirror driving units 17b, 17d is called a second movement.

In this light deflection unit 10, the first and second movements are alternately made by inverting the phases of the drive voltages applied to the mirror driving units 17a, 17c and the phases of the drive voltages applied to the mirror driving units 17b, 17d. In this way, as shown in FIG. 4, the mirror portion 11 is pivoted about the torsion bar 15 and a deflection angle θ of the mirror portion 11 varies. That is, the mirror driving units 17a, 17c and the mirror driving units 17b, 17d drive the mirror portion 11 in directions opposite to each other according to the drive voltages. Note that a straight line denoted by NL in FIG. 4 indicates a normal to the mirror portion 11 when the mirror portion 11 is not pivoted.

Figure 7:
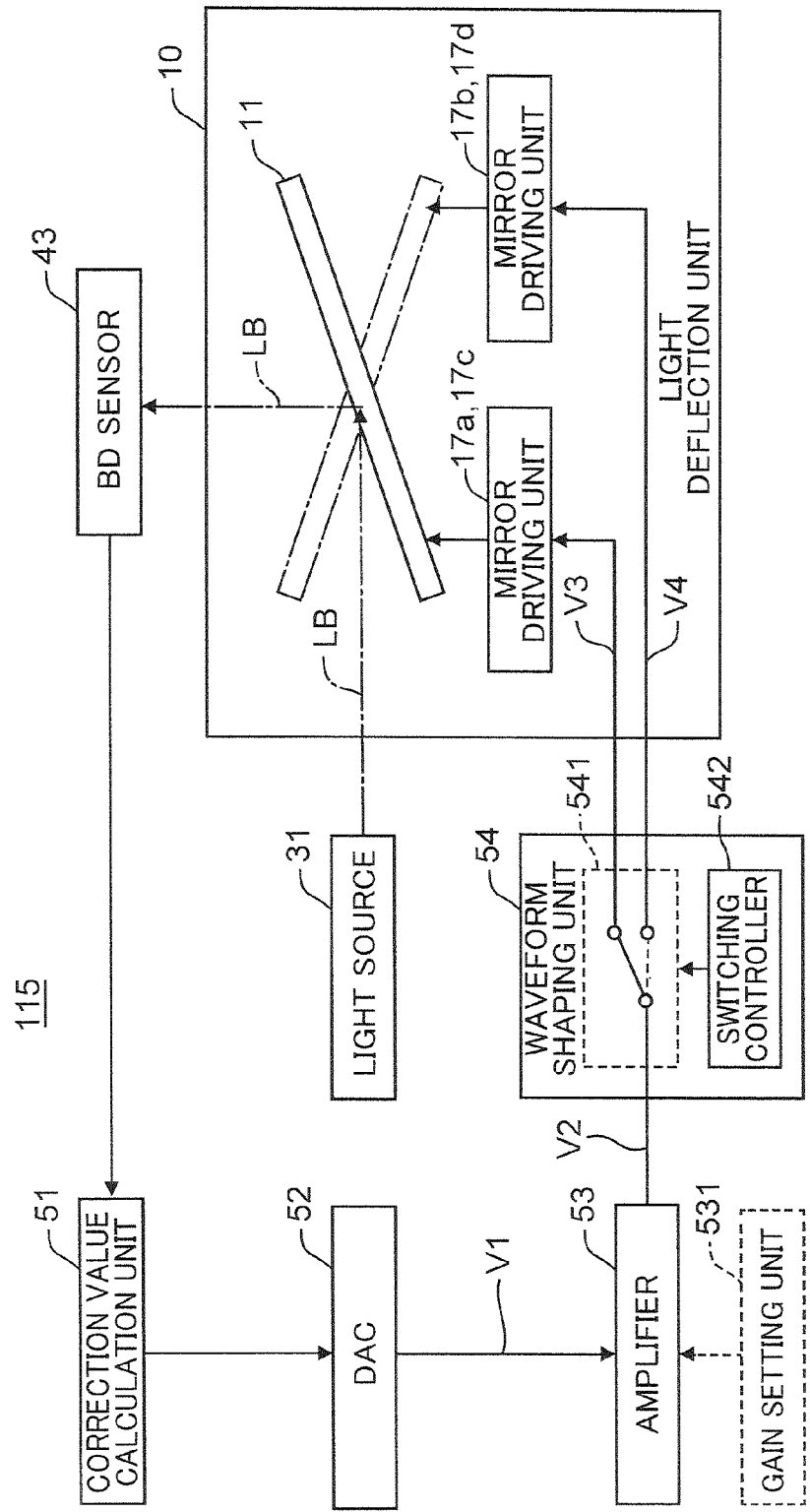
FIG. 7 is a block diagram showing the configuration of the exposure unit according to the first embodiment.

FIG. 7 is a block diagram showing the configuration of the exposure unit 115 according to the first embodiment. The exposure unit 115 includes the light source 31, the light deflection unit 10, the BD sensor 43, a correction value calculation unit 51, a DAC (DC voltage generation unit) 52, an amplifier (DC voltage amplification unit) 53 and a waveform shaping unit 54.

A light beam LB output from the light source 31 is scanned by being reflected and deflected by the mirror portion 11 pivoted by the mirror driving units 17a, 17b, 17c and 17d in the light deflection unit 10. The BD sensor 43 outputs a detection signal indicating light reception to the correction value calculation unit 51 when receiving the light beam LB beyond the effective scanning range R (FIG. 3).

The correction value calculation unit 51 calculates a correction voltage value used in correcting the drive voltage based on an output timing of the detection signal from the BD sensor 43. The deflection angle θ of the mirror portion 11 changes due to environmental variations such as air temperature near the multi-function peripheral 1 (exposure unit 115) and degradation over time. The correction value calculation unit 51 calculates correction values such as correction voltage values supplied to the mirror driving units 17 to compensate for a change in the deflection angle θ.

Figure 8:
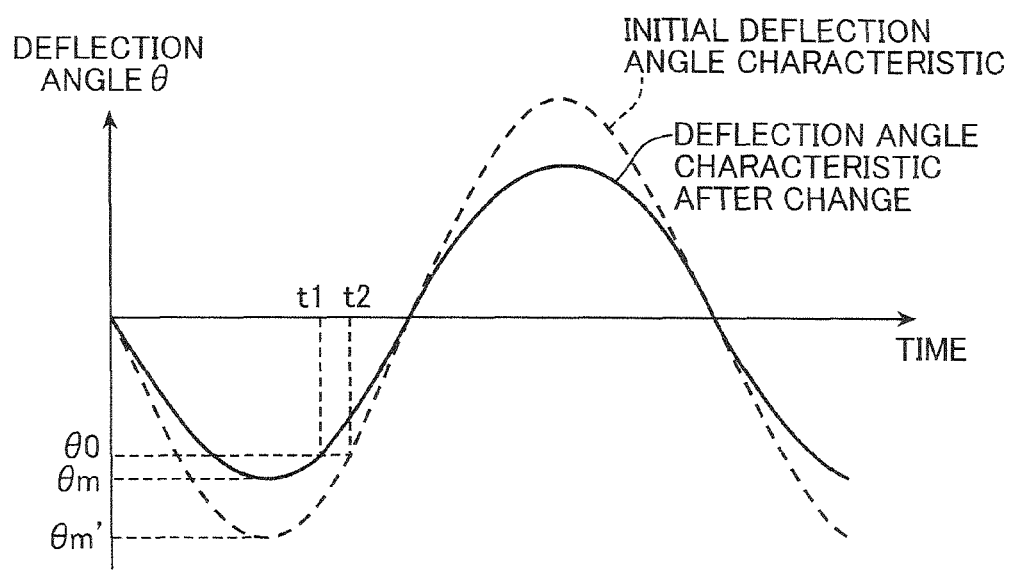
FIG. 8 is a graph showing temporal changes in a deflection angle of a mirror portion and a detection signal output from a BD sensor, A section (a) of FIG. 9 is a graph showing changes in the voltage values of DC voltages input to an amplifier and a waveform shaping unit, a section (b) is a graph showing a change in the voltage value of a DC voltage input to the mirror driving unit (first driving unit) and a section (c) is a graph showing a change in the voltage value of a DC voltage input to the mirror driving unit (second driving unit)

A method for compensating for a change in the deflection angle θ of the mirror portion 11 by the correction value calculation unit 51 is specifically described using FIG. 8. FIG. 8 is a graph showing temporal changes in the deflection angle θ of the mirror portion 11 and a detection signal output from the BD sensor 43. A deflection angle characteristic of the mirror portion 11 is such that when an environment changes, a state changes, for example, from a state where a maximum deflection angle shown by broken line is θm' (hereinafter, also referred to as an initial state) to a state where the maximum deflection angle shown by solid line is θm (<θm'). Since the frequencies of the drive voltages applied to the mirror driving units 17 do not change even if the environment changes, the frequency of the deflection angle characteristic of the mirror portion 11 does not change.

On the other hand, a deflection angle θ0 of the mirror portion 11 when the BD sensor 43 detects the light beam LB is determined by the arrangement position of the BD sensor 43, and constant. Thus, when the deflection angle characteristic of the mirror portion 11 is in the initial state, a detection signal indicating the reception of the light beam LB is output from the BD sensor 43 at time t2. However, if the deflection angle characteristic of the mirror portion 11 changes as shown by solid line, a detection signal indicating the reception of the light beam LB is output from the BD sensor 43 at time t1. As just described, there is a correlational relationship between a change in the output timing of the detection signal from the BD sensor 43 and a change in the maximum deflection angle of the mirror portion 11. This correlational relationship is stored as an experimental value by a test operation or the like in the ROM or the like in advance.

The correction value calculation unit 51 calculates a change amount of the maximum deflection angle of the mirror portion 11 using the output timing of the detection signal from the BD sensor 43 and the above correlational relationship stored in the ROM or the like in advance, and calculates the voltage value of the drive voltage for compensating for the calculated change amount as a correction voltage value. Then, the correction value calculation unit 51 outputs a digital signal, which is obtained by dividing the calculated correction voltage value by a gain used in the amplifier 53 to be described later and indicates a voltage value smaller than the correction voltage value, to the DAC 52.

Referring back to FIG. 7, the DAC 52 generates a DC voltage having a voltage value smaller than the correction voltage value. The DAC 52 is a so-called digital-analog converter and generates a DC voltage V1 indicated by the digital signal input from the correction value calculation unit 51 and outputs it to the amplifier 53.

The amplifier 53 amplifies the DC voltage V1 input from the DAC 52 to have a voltage value equal to the correction voltage value. The amplifier 53 amplifies the DC voltage V1 with a predetermined gain, generates a DC voltage V2 equal to the correction voltage value and outputs this to the waveform shaping unit 54. Note that the above gain is a gain fixed in advance. The DAC 52 generates a voltage value (DC voltage V1) obtained by dividing the correction voltage value by the gain fixed in advance.

The waveform shaping unit 54 shapes the waveform of the DC voltage V2 amplified by the amplifier 53 so that the DC voltage V2 varies in a basic cycle which is a variation cycle of the drive voltage supplied to the mirror driving units 17. This shaped voltage is output as drive voltages V3, V4 to the mirror driving units 17.

The waveform shaping unit 54 includes a switching element 541 and a switching controller 542. The switching element 541 is an element which is provided between the amplifier 53 and the mirror driving units 17 and switches the output destination of the DC voltage amplified by the amplifier 53 between the mirror driving units 17a, 17c and the mirror driving units 17b, 17d. The switching controller 542 switches the switching element 541 in every cycle which is half the basic cycle.

Figure 9:
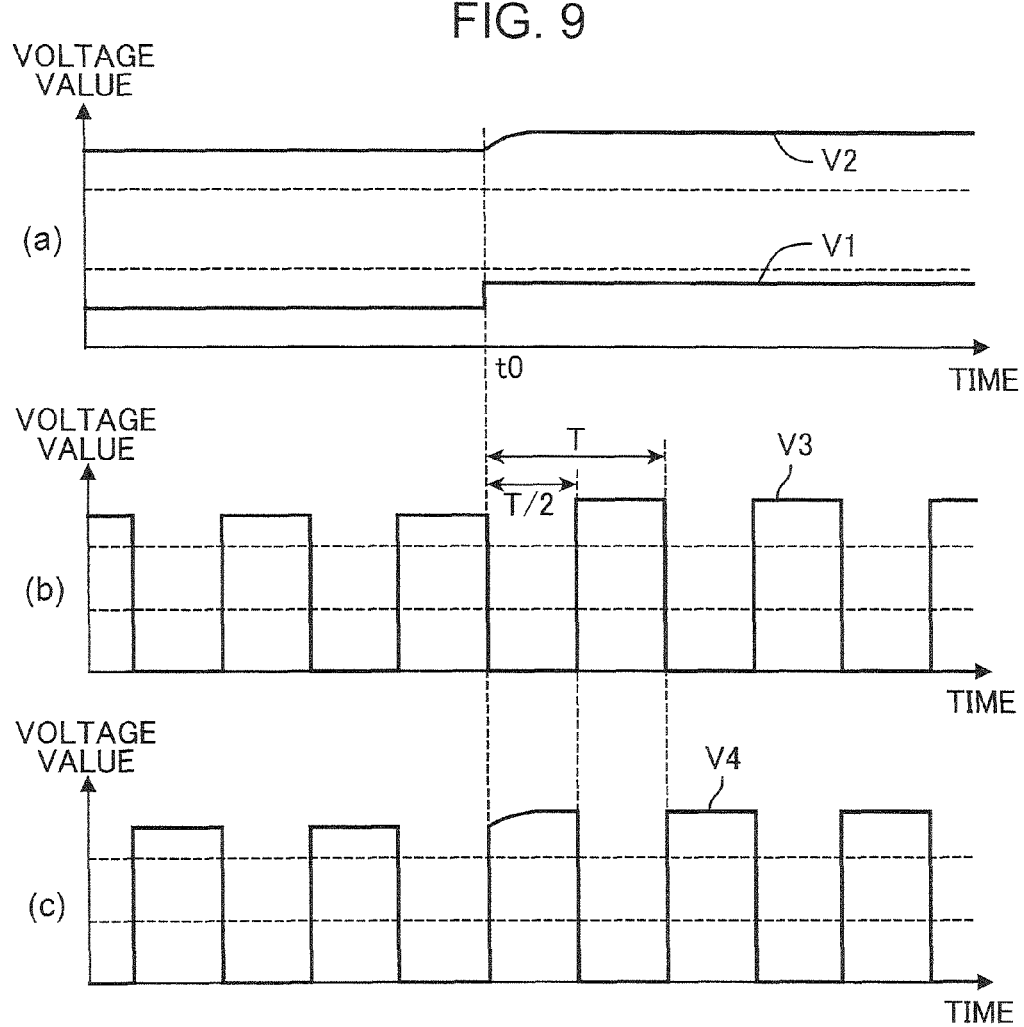
Figure 10:
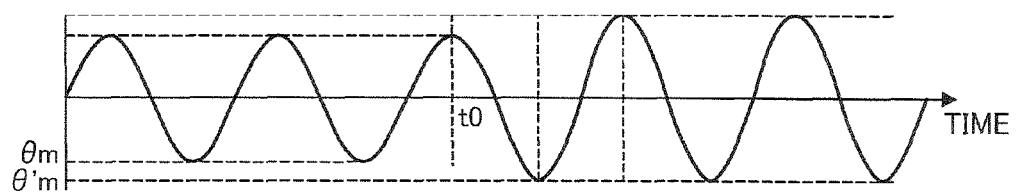
FIG. 10 is a graph showing a change in the deflection angle of the mirror portion corresponding to a change in the voltage value of the DC voltage input to the mirror driving unit.

A section (a) of FIG. 9 is a graph showing a change in the voltage value of the DC voltage V1 input to the amplifier 53 and a change in the voltage value of the DC voltage V2 input to the waveform shaping unit 54. A section (b) of FIG. 9 is a graph showing a change in the voltage value of the DC voltage V3 that is a DC voltage input to the mirror driving units 17a, 17c. A section (c) of FIG. 9 is a graph showing a change in the voltage value of the DC voltage V4 that is a DC voltage input to the mirror driving units 17b, 17d. FIG. 10 is a graph showing a change in the deflection angle θ of the mirror portion 11 corresponding to the changes in the voltage values of the drive voltages V3, V4.

As shown in the section (a) of FIG. 9, when the DC voltage V1 input to the amplifier 53 increases at time t0 based on the correction voltage value calculated by the correction value calculation unit 51, the waveform of the DC voltage V2 amplified by the amplifier 53 and input to the waveform shaping unit 54 smoothly becomes larger. Note that the waveform of the DC voltage V2 smoothly becomes larger due to poor responsiveness of the amplifier 53.

Thereafter, in the waveform shaping unit 54, as shown in the sections (b) and (c) of FIG. 9, the switching element 541 is switched in every cycle T/2, which is half the basic cycle T, by the switching controller 542 and the DC voltage V2 input to the waveform shaping unit 54 is alternately output between the mirror driving units 17b, 17d and the mirror driving units 17a, 17c in every cycle T/2, which is half the basic cycle T. In this way, the waveform shaping unit 54 shapes the waveform of the DC voltage V2 amplified by the amplifier 53 into a rectangular wave, which varies in the basic cycle T, and outputs it as the drive voltage V3 for the mirror driving units 17b, 17d and the drive voltage V4 for the mirror driving units 17a, 17c. As a result, the maximum deflection angle θ of the mirror portion 11 increases to θm' in accordance with the drive voltages V3, V4 by the time, for example, the cycle T/2, which is half the basic cycle T, elapses from time t0 and varies in the basic cycle T as shown in FIG. 10.

According to the configuration of the above embodiment, the DC voltage V1 having a voltage value smaller than the correction voltage value calculated by the correction value calculation unit 51 is generated by the DAC 52 and the generated DC voltage V1 is amplified to have a voltage value equal to the correction voltage value by the amplifier 53. The waveform of the amplified DC voltage V2 is shaped so that the DC voltage V2 varies in the basic cycle T by the waveform shaping unit 54 and the AC voltage that varies in the basic cycle T is output as the drive voltages V3, V4 to the mirror driving units 17.

That is, in this embodiment, the MEMS mirror 11 can be driven using the DAC 52 and the amplifier 53, which are simple and inexpensive, without providing an oscillator capable of generating a sine wave by changing a phase and an amplitude and an amplifier capable of precisely amplifying the sine wave, and the drive voltages V3, V4 at the time of driving the MEMS mirror 11 can be corrected to compensate for a change in the deflection angle θ of the MEMS mirror 11. As a result, it is possible to inexpensively provide an optical scanning device including a MEMS mirror for deflecting scanning laser light and capable of correcting drive voltages for driving the MEMS mirror to compensate for a change in the deflection angle of the MEMS mirror.

Further, the waveform shaping unit 54 is configured to include the switching element 541 and the switching controller 542. That is, the waveforms of the drive voltages V3, V4 output to the mirror driving units 17a, 17c and the mirror driving units 17b, 17d can be shaped into rectangular waves, which vary in the basic cycle T, by a simple configuration for alternately outputting the DC voltage V2 amplified by the amplifier 53 to the mirror driving units 17a, 17c and the mirror driving units 17b, 17d in every cycle, which is half the basic cycle T.

Further, since the waveform shaping unit 54 can have a simple configuration using the switching element 541 capable of switching between at least two drive voltage supply paths, the exposure unit 115 can be inexpensively provided.

Note that the configurations and the settings of the above embodiment shown in FIGS. 1 to 10 are merely examples and limitation to these is not intended.

For example, a correction duty ratio which is a duty ratio indicating a ratio of a period, during which the DC voltage V2 amplified by the amplifier 53 is output to the mirror driving units 17, out of the basic cycle T may be further calculated in the correction value calculation unit 51, and the drive voltage may be set at a high level during a period corresponding to the correction duty ratio calculated in the correction value calculation unit 51, out of the basic cycle T, in the waveform shaping unit 54. A specific configuration is shown in FIG. 11.

Figure 11:
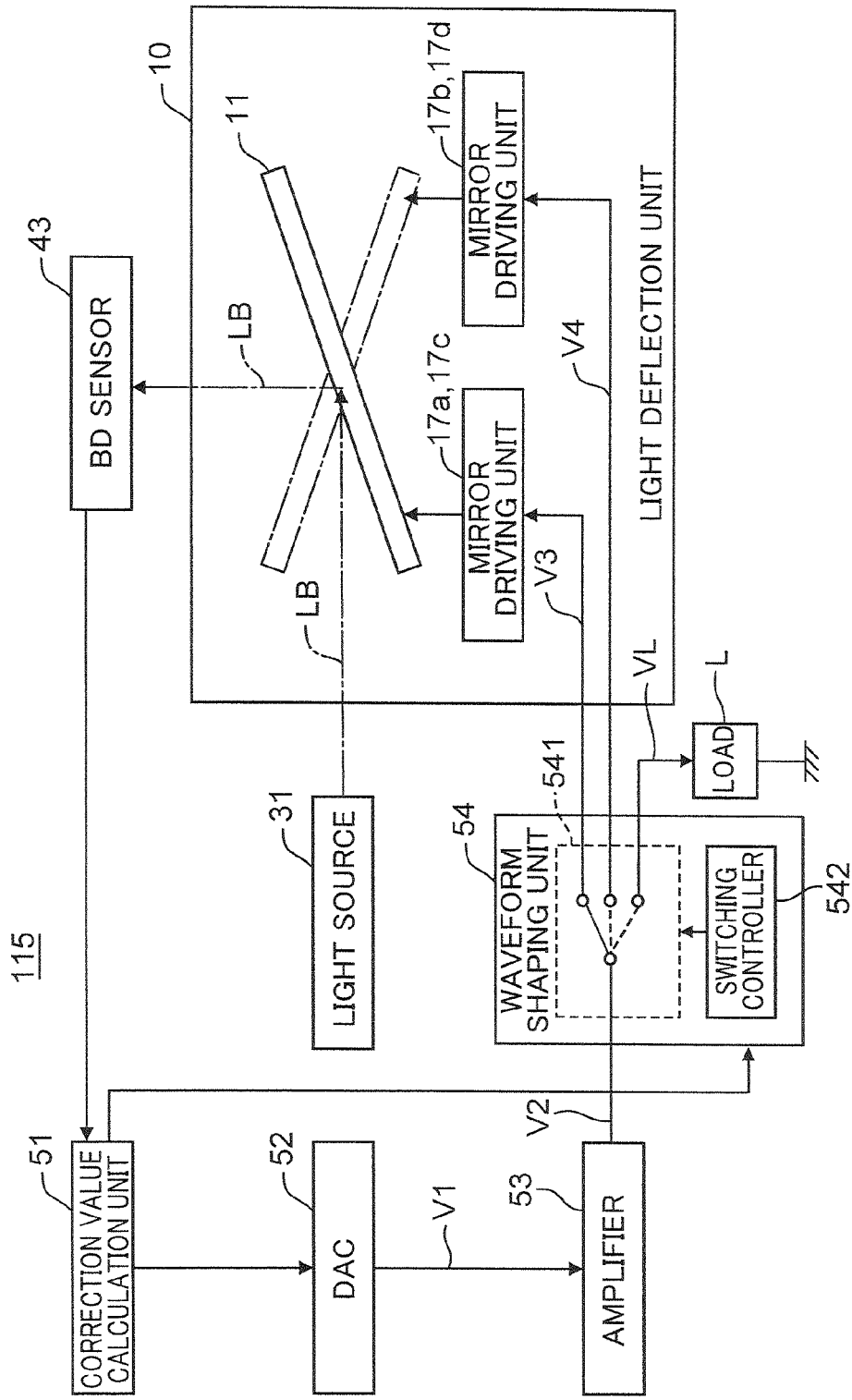
FIG. 11 is a block diagram showing the configuration of an exposure unit according to a modification of the first embodiment, A section (a) of FIG. 12 is a graph showing a change in the voltage value of the DC voltage input to the mirror driving unit (first driving unit) and corresponding to a correction duty ratio calculated by a correction value calculation unit, a section (b) is a graph showing a change in the voltage value of a DC voltage input to a load and corresponding to the correction duty ratio, and a section (c) is a graph showing a change in the voltage value of the DC voltage input to the mirror driving unit (second driving unit) and corresponding to the correction duty ratio.

FIG. 11 is a block diagram showing the configuration of a exposure unit 115 according to a modification of the first embodiment. The correction value calculation unit 51 calculates a change amount of the maximum deflection angle of the mirror portion 11 using the output timing of a detection signal from the BD sensor 43 and the correlational relationship stored in the ROM or the like in advance as described above. Then, the correction value calculation unit 51 calculates a correction voltage value for roughly compensating for the calculated change amount of the maximum deflection angle of the mirror portion 11 (e.g. compensating for 95% of the change amount), calculates a correction duty ratio for compensating the remaining small change amount (e.g. compensating for 5% of the change amount), and outputs them to the waveform shaping unit 54.

In accordance with this, the switching element 541 is configured to be able to switch the output destination of the DC voltage V2 amplified by the amplifier 53 also to a load L in addition to the mirror driving units 17a, 17c and the mirror driving units 17b, 17d.

Figure 12:
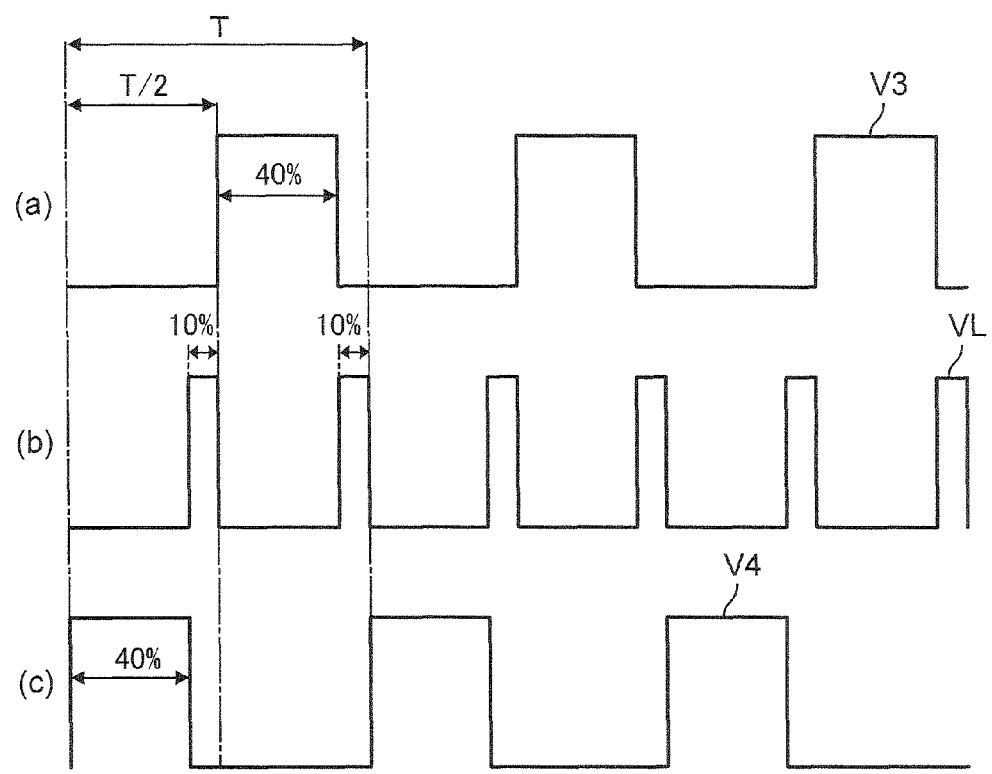

A section (a) of FIG. 12 is a graph showing a change in the voltage value of a DC voltage V3 that is a DC voltage input to the mirror driving units 17a, 17c and corresponding to a correction duty ratio calculated by the correction value calculation unit 51. A section (b) of FIG. 12 is a graph showing a change in the voltage value of a DC voltage VL input to a load L and corresponding to the correction duty ratio, and a section (c) of FIG. 12 is a graph showing a change in the voltage value of a DC voltage V4 input to the mirror driving units 17b, 17d and corresponding to the correction duty ratio.

A case is assumed where the correction duty ratio calculated by the correction value calculation unit 51 is, for example, 40%. The switching controller 542 switches the switching element 541 such that the DC voltage V2 amplified by the amplifier 53 is output to the mirror driving units 17b, 17d during a first 40% period of the basic cycle T according to the correction duty ratio of 40% as shown in the section (a) of FIG. 12.

Subsequently, the switching controller 542 switches the switching element 541 so that the DC voltage V2 amplified by the amplifier 53 is output to the load L during a 10% period of the basic cycle T, which is the remaining period until the cycle T/2, which is half the basic cycle T, elapses, as shown in the section (b) of FIG. 12.

Subsequently, the switching controller 542 switches the switching element 541 so that the DC voltage V2 amplified by the amplifier 53 is output to the mirror driving units 17a, 17c during a 40% period of the basic cycle T, as shown in the section (c) of FIG. 12.

Then, the switching controller 542 switches the switching element 541 so that the DC voltage V2 amplified by the amplifier 53 is output to the load L during a 10% period of the basic cycle T, which is the remaining period until the basic cycle T elapses, as shown in the section (b) of FIG. 12.

According to this configuration, the drive voltages supplied to the mirror driving units 17 can be corrected by adjusting the application period of the drive voltages to the mirror driving units 17 using not only the correction voltage value, but also the correction duty ratio. Thus, the DC voltage V2 output from the amplifier 53 needs not be precisely set at such a voltage value that the maximum deflection angle of the mirror portion 11 reaches a predetermined value when the DC voltage V2 is applied to each mirror driving unit 17 for the cycle T/2, which is half the basic cycle T.

Further, the waveform shaping unit 54 is not limited to the configuration including the switching element 541 and the switching controller 542 and adapted to shape the waveform of the DC voltage V2 input from the amplifier 53 into a rectangular wave that varies in the basic cycle T. For example, the waveform shaping unit 54 may be configured using an inexpensive distributor or the like capable of converting the waveform of the DC voltage V2 input from the amplifier 53 into a rectangular wave, a triangular wave, a sawtooth wave, a sine wave or the like which varies in the basic cycle T.

However, in the case of the configuration in which the correction duty ratio is calculated by the correction valve calculation unit 51, the waveform shaping unit 54 may be configured using an inexpensive distributor or the like capable of shaping the waveform of the DC voltage V2 input from the amplifier 53 into a rectangular wave which varies in the basic cycle T and setting the duty ratio of that rectangular wave at the correction duty ratio.

Further, although the waveform shaping unit 54 is illustrated to have two output destinations of the DC voltage V2 amplified by the amplifier 53 in the configuration of the above embodiment, there is no limitation to this. For example, only one mirror driving unit for driving the mirror portion may be present as disclosed in the above patent literature 2 and, in accordance with this, the waveform shaping unit 54 may be configured to shape the waveform of the DC voltage V2 amplified by the amplifier 53 so that the DC voltage V2 varies in the basic cycle T and output the shaped DC voltage V2 as a drive voltage to the single mirror driving unit.

The waveform shaping unit 54 in this configuration includes, for example, the switching element 541 and the switching controller 542 as in the above embodiment. The switching controller 542 controls the switching element 541 so that the output destination of the DC voltage V2 amplified by the amplifier 53 is alternately switched between the single mirror driving unit and a load, for example, in every cycle which is half the basic cycle T. Further, without being limited to this, the waveform shaping unit 54 may be configured using an inexpensive distributor or the like capable of converting the waveform of the DC voltage V2 input from the amplifier 53 into a rectangular wave, a triangular wave, a sawtooth wave, a sine wave or the like which varies in the basic cycle T.

In the case of the configuration in which the correction duty ratio is calculated by the correction valve calculation unit 51, the waveform shaping unit 54 may be configured using a distributor or the like capable of shaping the waveform of the DC voltage V2 input from the amplifier 53 into a rectangular wave which varies in the basic cycle T and setting the duty ratio of that rectangular wave at the correction duty ratio.

In the above embodiment, the amplifier 53 is illustrated to amplify the DC voltage V1 output from the DAC 52 with the gain fixed in advance. Instead of this, the amplifier 53 may be configured by an amplifier capable of amplifying a DC voltage output from the DAC 52 with a variable gain.

In accordance with this, the DAC 52 is configured to output a DC voltage having a voltage value fixed in advance and sufficiently smaller than the correction voltage value calculated by the correction valve calculation unit 51 to the amplifier 53. Furthermore, the exposure unit 115 is configured to further include a gain setting unit 531 (block is shown by dotted line in FIG. 7) for calculating a value obtained by dividing the correction voltage value calculated by the correction valve calculation unit 51 by a voltage value of the DC voltage output from the DAC 52 which value is fixed in advance and setting this calculated value as the gain of the amplifier 53.

According to this configuration, the DC voltage having the voltage value fixed in advance and smaller than the correction voltage value is generated by the DAC 52. That is, an image forming apparatus can be configured using the DAC 52 simpler and less expensive as compared with the DAC 52 for generating DC voltages having various voltage values.

<Second Embodiment>

Figure 13:
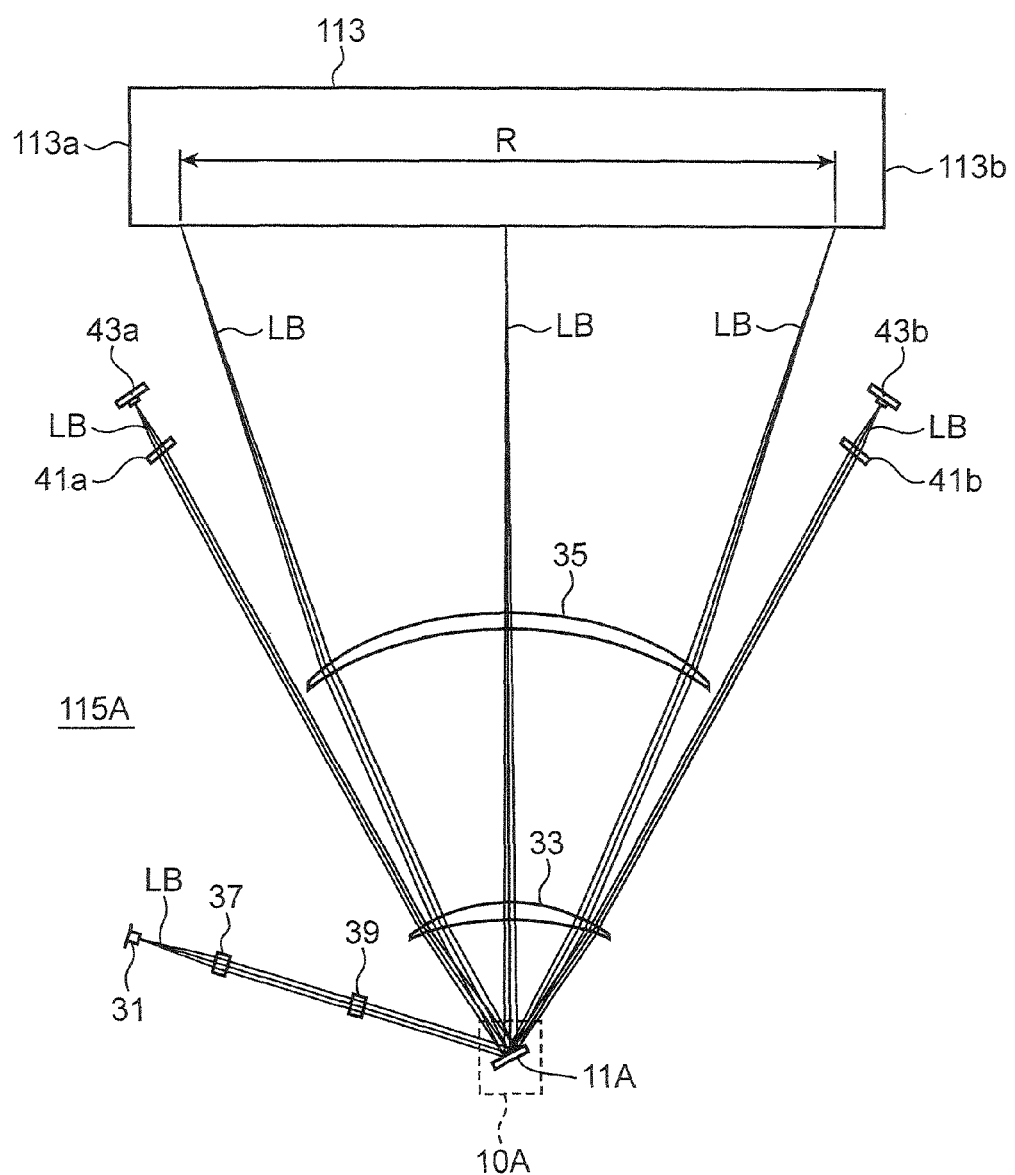
FIG. 13 is a diagram showing an arrangement relationship of optical components configuring an exposure unit according to a second embodiment of the present invention.

FIG. 13 is a diagram showing an arrangement relationship of optical components configuring an exposure unit 115A according to a second embodiment. The exposure unit 115A includes a light source 31, a light deflection unit 10A with a mirror portion 11A, two scanning lenses 33, 35, BD lenses 41a, 41b and BD sensors (light detection unit) 43a, 43b. Note that the same components as those of the exposure unit 115 of the first embodiment are denoted by the same reference signs and not described or only briefly described.

In this embodiment, the BD lens 41a and the BD sensor 43a are arranged on one lateral portion 113a of a photoconductive drum 113 and the BD lens 41b and the BD sensor 43b are arranged on the other lateral portion 113b. In the case of scanning a light beam LB across the photoconductive drum 113 from the one lateral portion 113a to the other lateral portion 113b of the photoconductive drum 113, the light beam LB beyond an effective scanning range R is condensed by the BD lenses 41a, 41b and received by the BD sensors 43a, 43b. The BD sensors 43a, 43b respectively output detection signals indicating light reception when receiving the light beam LB beyond the effective scanning range R. The detection signals output from the BD sensors 43a, 43b are utilized such as to synchronize an image signal indicating an electrostatic latent image to be formed on the photoconductive drum 113 and a timing for scanning the effective scanning range R.

Figure 14:
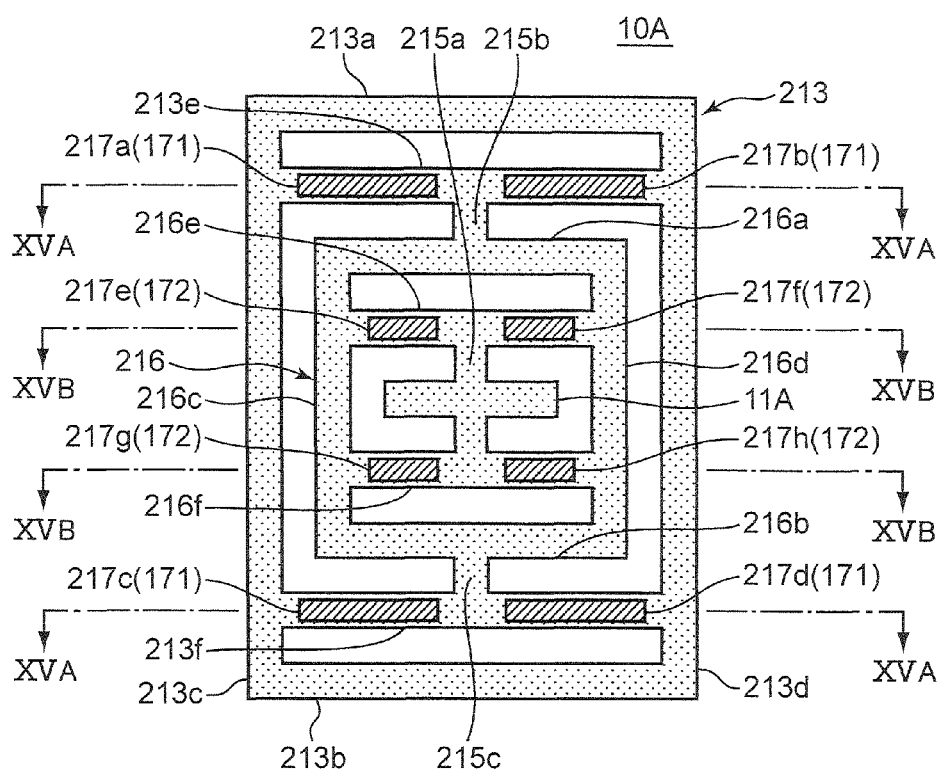
FIG. 14 is a diagram showing the principle of a light deflection unit according to the second embodiment.
Figure 15A:
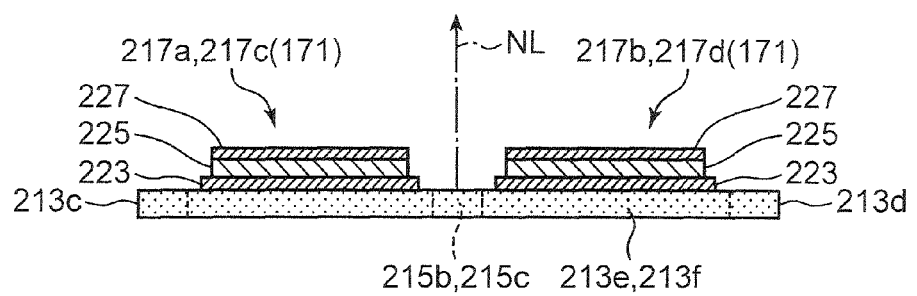
FIG. 15A is a sectional view cut along line XVA-XVA of the light deflection unit shown in FIG. 14.
Figure 15B:
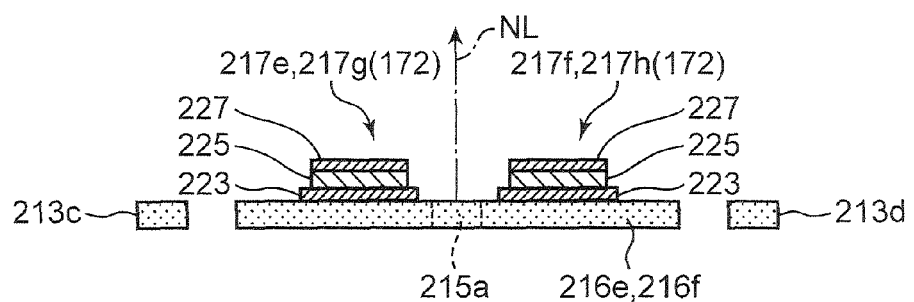
FIG. 15B is a sectional view cut along line XVB-XVB of the light deflection unit shown in FIG. 14.

The light deflection unit 10A is described. FIG. 14 is a diagram showing the principle of the light deflection unit 10A. FIG. 15A is a sectional view cut along line XVA-XVA of the light deflection unit 10A shown in FIG. 14 and FIG. 15B is a sectional view cut along line XVB-XVB of the light deflection unit shown 10A in FIG. 14.

The light deflection unit 10A includes the mirror portion 11A, a movable frame 216, a fixed frame 213, torsion bars 215a, 215b and 215c and mirror driving units (driving units) 217a, 217b, 217c, 217d, 217e, 217f, 217g and 217h. The mirror portion 11A deflects a light beam LB output from the light source 31. The mirror driving units 217a to 217h pivot the mirror portion 11A using basic drive voltages as drive voltages, which vary in a predetermined basic cycle, and superimposed drive voltages which vary in a superimposition cycle shorter than the basic cycle.

The mirror portion 11A is a MEMS mirror in the form of a rectangular plate. This mirror portion 11A is fixed to the torsion bar (first torsion bar) 215a and arranged in a central part of the light deflection unit 10A. The light beam LB is incident on the mirror portion 11A and reflected and deflected by the mirror portion 11A.

The movable frame 216 has a rectangular shape. The movable frame 216 is configured by a pair of side portions 216a, 216b, a pair of side portions 216c, 216d extending in a direction perpendicular to the pair of side portions 216a, 216b and beams 216e, 216f supported by the pair of side portions 216c, 216d. The beams 216e, 216f are members parallel to the pair of side portions 216a, 216b and end parts thereof are respectively supported by the pair of side portions 216c, 216d.

The torsion bar 215a extends in a shorter side direction of the mirror portion 11A to pass through central parts of the longer sides of the mirror portion 11A. One end of the torsion bar 215a is supported by the beam 216e, and the other end thereof is supported by the beam 216f. The torsion bar 215a has a first torsion axis extending in the shorter side direction and supports the mirror portion 11A on the movable frame 216 in a state rotatable by a torsional movement about the first torsion axis.

On the beam 216e, the mirror driving unit 217e is formed on a side closer to the side portion 216c than the torsion bar 215a and the mirror driving unit 217f is formed on a side closer to the side portion 216d than the torsion bar 215a. On the beam 216f, the mirror driving unit 217g is formed on a side closer to the side portion 216c than the torsion bar 215a and the mirror driving unit 217h is formed on a side closer to the side portion 216d than the torsion bar 215a.

The fixed frame 213 has a rectangular shape. The fixed frame 213 is a frame provided outside the movable frame 216 and fixedly arranged. The fixed frame 213 is configured by a pair of side portions 213a, 213b, a pair of side portions 213c, 213d extending in a direction perpendicular to the pair of side portions 213a, 213b and beams 213e, 213f supported by the pair of side portions 213c, 213d.

The torsion bars (second torsion bar) 215b, 215c extend on the same axis as the torsion bar 215a, i.e. extends in the shorter side direction of the mirror portion 11A such that extended lines thereof pass through the central parts of the longer sides of the mirror portion 11A. One end of the torsion bar 215b is supported by the beam 213e and the other end thereof supports the side portion 216a of the movable frame 216. One end of the torsion bar 215c is supported by the beam 213f and the other end thereof supports the side portion 216b of the movable frame 216. That is, the movable frame 216 is supported by the torsion bars 215b, 215c. The torsion bars 215b, 215c have second torsion axes coaxial with the first torsion axis of the torsion bar 215a and support the movable frame 216 on the fixed frame 213 in a state rotatable by torsional movements about the second torsion axes.

On the beam 213e, the mirror driving unit 217a is formed on a side closer to the side portion 213c than the torsion bar 215b and the mirror driving unit 217b is formed on a side closer to the side portion 213d than the torsion bar 215b. On the beam 213f, the mirror driving unit 217c is formed on a side closer to the side portion 213c than the torsion bar 215c and the mirror driving unit 217d is formed on a side closer to the side portion 213d than the torsion bar 215c.

As shown in FIG. 15A, the mirror driving unit 217a is composed of a lower electrode 223, a PZT thin film 225 and an upper electrode 227. The mirror driving units 217b, 217c and 217d have the same configuration as the mirror driving unit 217a. Note that a normal to the fixed frame 213 is denoted by NL.

Unless it is necessary to distinguish, the mirror driving units 217a, 217b, 217c and 217d are written as the mirror driving units 171 below. AC voltages which vary in a predetermined fixed basic cycle are applied as drive voltages to the mirror driving units 171. In the following description, the drive voltages for the mirror driving units 171 are written as basic drive voltages.

As shown in FIG. 15B, the mirror driving unit 217e is composed of a lower electrode 223, a PZT thin film 225 and an upper electrode 227. The mirror driving units 217f, 217g and 217h have the same configuration as the mirror driving unit 217e. Note that a normal to the fixed frame 213 is denoted by NL.

Unless it is necessary to distinguish, the mirror driving units 217e, 217f, 217g and 217h are written as the mirror driving units 172 below. AC voltages which vary in a predetermined fixed superimposition cycle shorter than the above basic cycle, which is a variation cycle of the basic drive voltages, are applied as drive voltages to the mirror driving units 172. In the following description, the drive voltages for the mirror driving units 172 are written as superimposed drive voltages.

Figure 16A:
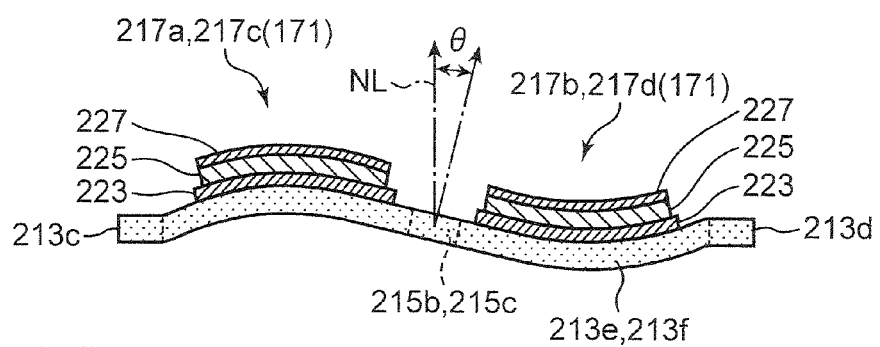
FIG. 16A is a view showing a state where PZT thin films of mirror driving units on one side extend and PZT thin films of mirror driving units on the other side contract on the same cross-section as in FIG. 15A.

FIG. 16A is a view showing a state where basic drive voltages are so applied to the mirror driving units 171 that the PZT thin films 225 of the mirror driving units 217a, 217c (first driving unit) extend and the PZT thin films 225 of the mirror driving units 217b, 217d (second driving unit) contract on the same cross-section as in FIG. 15A. The beams 213e, 213f are deflected, whereby the torsion bars 215b, 215c are twisted and the movable frame 216 is inclined together with the torsion bars 215b, 215c.

Rightward torsional movements of the torsion bars 215b, 215c due to the extension of the PZT thin films 225 of the mirror driving units 217a, 217c and the contraction of the PZT thin films 225 of the mirror driving units 217b, 217d are called first movements. On the other hand, leftward torsional movements of the torsion bars 215b, 215c due to the contraction of the PZT thin films 225 of the mirror driving units 217a, 217c and the extension of the PZT thin films 225 of the mirror driving units 217b, 217d are called second movements.

The phases of the drive voltages applied to the mirror driving units 217a, 217c and the phases of the drive voltages applied to the mirror driving units 217b, 217d are inverted and the beams 213e, 213f are deflected so that the first and second movements are alternately repeated. In this way, the movable frame 216 rotates about the torsion bars 215b, 215c. That is, the mirror driving units 171 drive the movable frame 216 in directions opposite to each other according to the basic drive voltages.

Figure 16B:
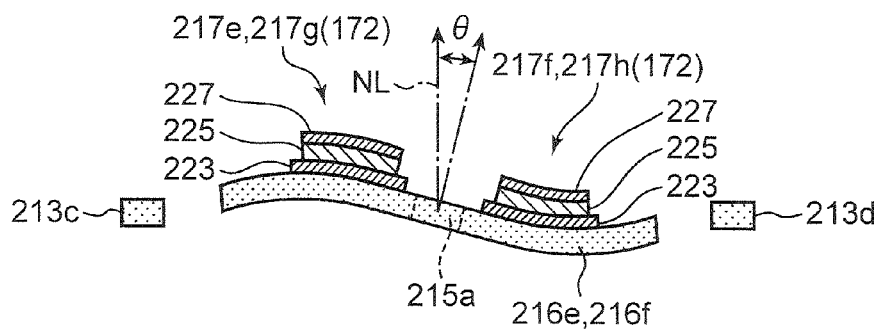
FIG. 16B is a view showing the state where the PZT thin films of the mirror driving units on one side extend and the PZT thin films of the mirror driving units on the other side contract on the same cross-section as in FIG. 15B.

FIG. 16B is a view showing a state where superimposed drive voltages are so applied to the mirror driving units 172 that the PZT thin films 225 of the mirror driving units 217e, 217g (third driving unit) extend and the PZT thin films 225 of the mirror driving units 217f, 217h (fourth driving unit) contract on the same cross-section as in FIG. 15B. The beams 216e, 216f are deflected, whereby the torsion bar 215a is twisted and the mirror portion 11A is inclined together with the torsion bar 215a.

A rightward torsional movement of the torsion bar 215a due to the extension of the PZT thin films 225 of the mirror driving units 217e, 217g and the contraction of the PZT thin films 225 of the mirror driving units 217f, 217h is called a third movement. On the other hand, a leftward torsional movement of the torsion bar 215a due to the contraction of the PZT thin films 225 of the mirror driving units 217e, 217g and the extension of the PZT thin films 225 of the mirror driving units 217f, 217h is called a fourth movement.

The phases of the superimposed drive voltages applied to the mirror driving units 217e, 217g and the phases of the superimposed drive voltages applied to the mirror driving units 217f, 217h are inverted and the beams 216e, 216f are deflected so that the third and fourth movements are alternately repeated. In this way, the mirror portion 11A rotates about the torsion bar 215a. That is, the mirror driving units 172 drive the mirror portion 11A in directions opposite to each other according to the superimposed drive voltages. Here, a driving direction of the mirror portion 11A by the mirror driving units 217e, 217g (third driving unit) and that of the movable frame 216 by the mirror driving units 217a, 217c (first driving unit) are the same. Further, a driving direction of the mirror portion 11A by the mirror driving units 217f, 217h (fourth driving unit) and that of the movable frame 216 by the mirror driving units 217b, 217d (second driving unit) are the same.

Figure 17:
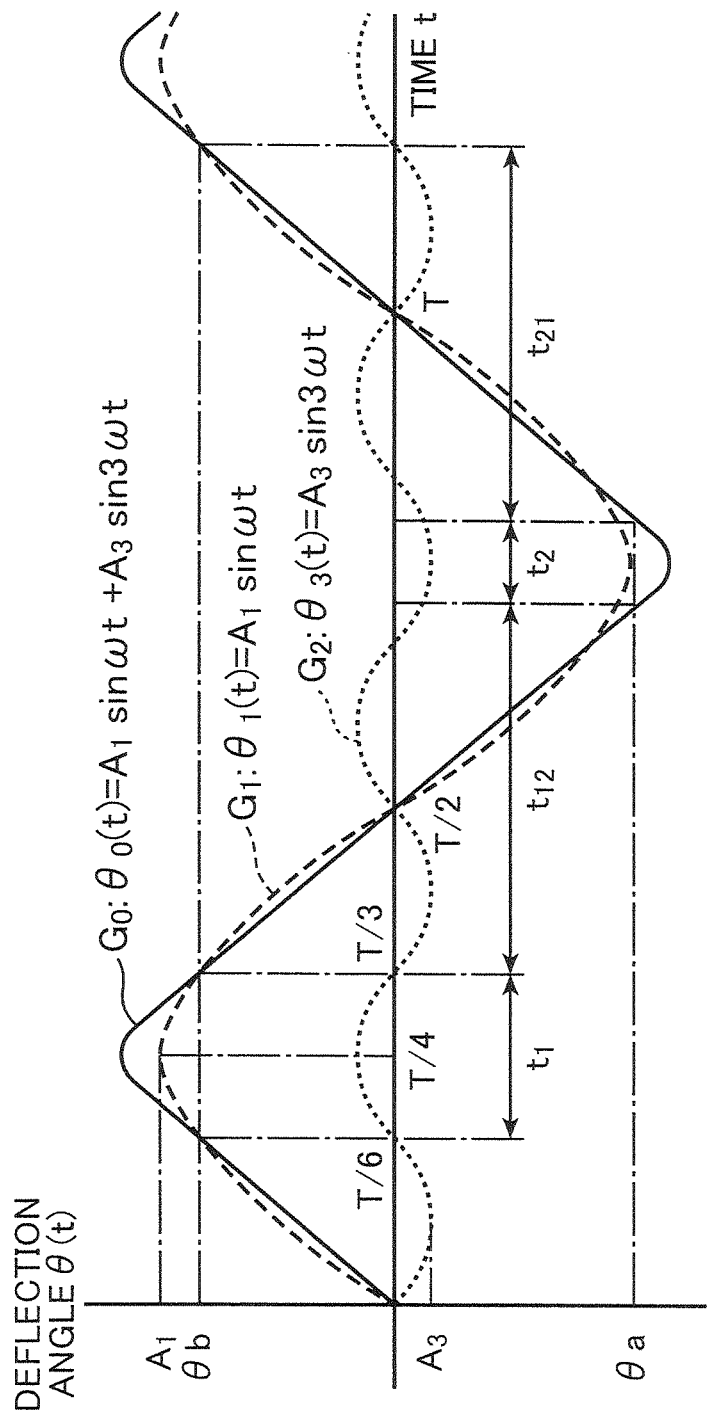
FIG. 17 is a graph showing a temporal change in deflection angles of a movable frame and a mirror portion.

Next, variations of a deflection angle θ with respect to the normals NL to the movable frame 216 and the mirror portion 11A are described with reference to FIG. 17. FIG. 17 is a graph showing temporal changes in the deflection angles θ of the movable frame 216 and the mirror portion 11A. In FIG. 17, a graph G1 indicates the temporal change in the deflection angle θ of the movable frame 216 with respect to the normal NL due to the rotation of the movable frame 216 when the mirror driving units 171 are driven. This temporal change shows the waveform of a sine wave (θ1(t)=A1 sin ωt) having an amplitude of A1 and an angular frequency of ω. This sine wave having an amplitude of A1 and an angular frequency of ω is written as a basic sine wave θ1 below. Here, there is a relationship of ω=2π/T (=2πf) between the angular frequency ω and one cycle T (frequency f) of this sine wave.

Further, in FIG. 17, a graph G2 indicates the temporal change in the deflection angle θ of the mirror portion 11A with respect to the normal NL due to the rotation of the mirror portion 11A when only the mirror driving units 172 are driven without driving the mirror driving units 171. That is, this temporal change shows a relative temporal change of the deflection angle θ of the mirror portion 11A with respect to the movable frame 216 caused by the driving of the mirror driving units 172. This temporal change shows the variation of a sine wave (θ3(t)=A3 sin 3ωt) having an amplitude of A3 smaller than A1 and an angular frequency of 3ω which is three times as high as the basic sine wave θ1, i.e. having three times as high a frequency as the basic sine wave θ1. This sine wave having an amplitude of A3 and an angular frequency of 3ω is written as a superimposed sine wave ω3 below.

That is, by driving the mirror driving units 171 and the mirror driving units 172 together and superimposing the basic sine wave θ1 and the superimposed sine wave ω3, the deflection angle θ of the mirror portion 11A is changed over time to have the waveform of a substantially triangular wave (θ0(t)=A1 sin ωt+A3 sin 3ωt) as shown in a graph G0 of FIG. 17. In this way, the light beam LB incident on the mirror portion 11A can be reflected and deflected toward the photoconductive drum 113 substantially at a constant speed and an electrostatic latent image can be formed on the photoconductive drum 113 substantially at a constant speed. This substantially triangular wave is written as a substantially triangular wave θ0 below.

Figure 18:
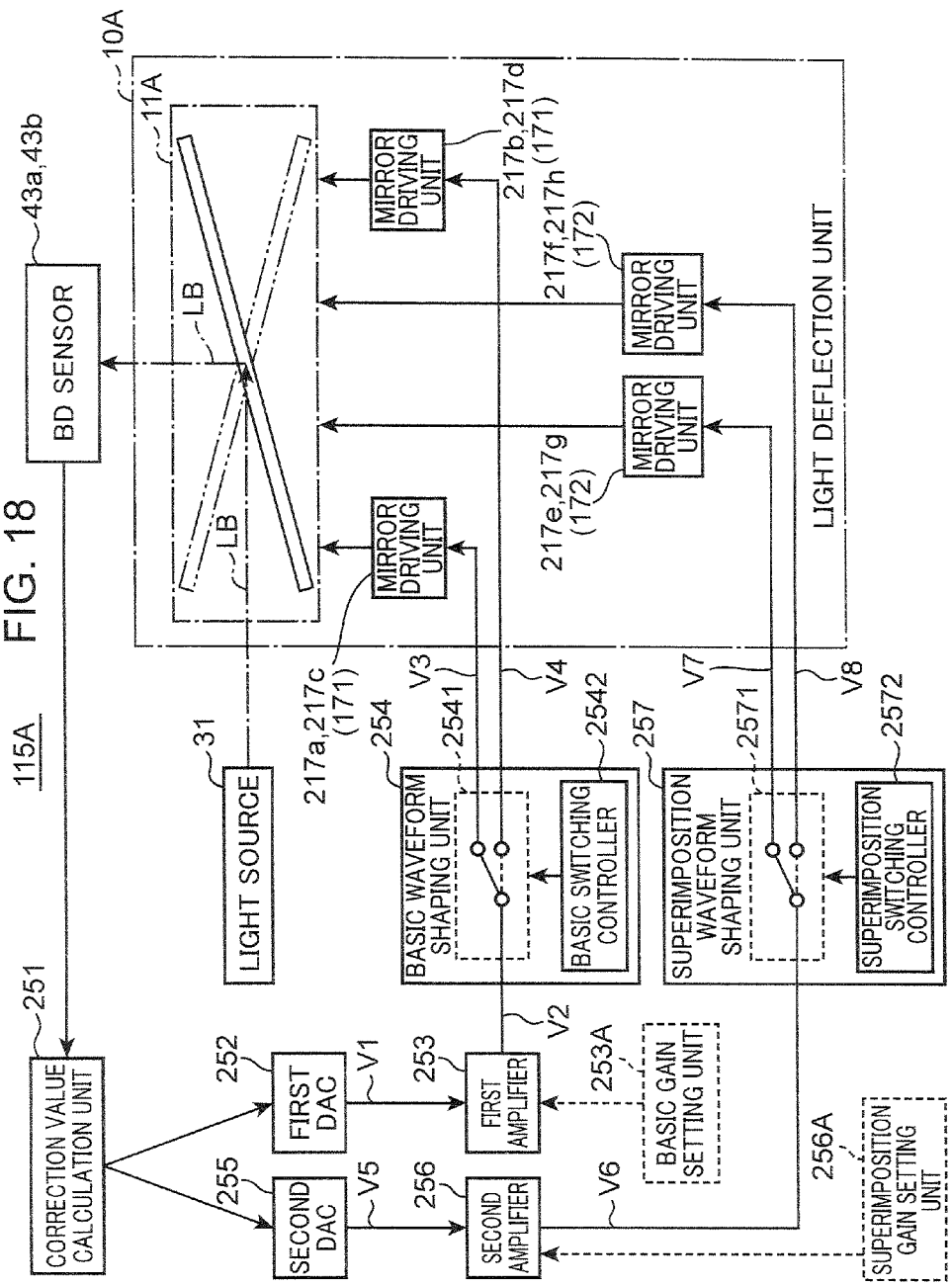
FIG. 18 is a block diagram showing the configuration of the exposure unit according to the second embodiment, A section (a) of FIG. 19 is a graph showing changes in the voltage values of DC voltages input to a first amplifier and a basic waveform shaping unit, a section (b) is a graph showing a change in the voltage value of a DC voltage input to a mirror driving unit (first driving unit) and a section (c) is a graph showing a change in the voltage value of a DC voltage input to a mirror driving unit (second driving unit)

FIG. 18 is a block diagram showing the configuration of the exposure unit 115A according to the second embodiment. The exposure unit 115A includes the light source 31, the light deflection unit 10A, the BD sensors 43a, 43b, a correction value calculation unit 251, a first DAC (basic voltage generation unit) 252, a first amplifier (basic voltage amplification unit) 253, a basic waveform shaping unit 254, a second DAC (superimposed voltage generation unit) 255, a second amplifier (superimposed voltage amplification unit) 256 and a superimposition waveform shaping unit 257.

A light beam LB output from the light source 31 is scanned by being reflected and deflected by the mirror portion 11A pivoted by the mirror driving units 171, 172 in the light deflection unit 10A. The BD sensors 43a, 43b respectively output detection signals indicating light reception to the correction value calculation unit 251 when receiving the light beam LB beyond the effective scanning range R (FIG. 13).

The correction value calculation unit 251 calculates a basic correction voltage value as a voltage value used in correcting the basic drive voltage and a superimposition correction voltage value as a voltage value used in correcting the superimposed drive voltage based on output timings of the detection signals from the BD sensors 43a, 43b. The deflection angle $\theta$ of the mirror portion 11A changes due to environmental variations such as air temperature near the multi-function peripheral 1 (exposure unit 115A) and degradation over time. The correction value calculation unit 251 calculates correction values such as the basic correction voltage value supplied to the mirror driving units 171 and the superimposition correction voltage value supplied to the mirror driving units 172 to compensate for a change in the deflection angle $\theta$.

A method for compensating for a change in the deflection angle $\theta$ of the mirror portion 11A by the correction value calculation unit 251 is specifically described using FIG. 17. Note that the BD sensor 43a is fixed at a position where the light beam LB reflected by the mirror portion 11A is incident when the deflection angle of the mirror portion 11A is $\theta a$ and the BD sensor 43b is fixed at a position where the light beam LB reflected by the mirror portion 11A is incident when the deflection angle of the mirror portion 11A is $\theta b$.

Further, $\theta a$, $\theta b$ have relationships of $\theta b = A1\sqrt{3}/2$, $|\theta b| \neq |\theta a|$ using the amplitude A1 of the basic sine wave $\theta 1$. Thus, the basic sine wave $\theta 1$ shows a value equal to the amplitude A1 upon the elapse of ¼ of one cycle T and shows a value equal to $\theta b$ corresponding to the fixed position of the BD sensor 43b upon the elapse of ⅙ of one cycle T and upon the elapse of ⅓ of one cycle T.

The BD sensors 43a, 43b output the detection signals indicating the reception of the light beam LB to the correction value calculation unit 251 four times during one cycle T by reciprocal oscillation (pivoting movements) of the mirror portion 11A. By this, the correction value calculation unit 251 calculates four signal intervals t1, t12, t2 and t21. Note that these four signal intervals when a deflection angle characteristic of the mirror portion 11A is in an initial state are stored as experimental values such as by a test operation in a ROM or the like in advance.

The superimposed sine wave $\theta 3$ is 0 when the substantially triangular wave $\theta 0$ obtained by superimposing the basic sine wave $\theta 1$ and the superimposed sine wave $\theta 3$ and shown as the graph G0 in FIG. 17 is $\theta 0(t) = \theta b$ in the case where the amplitude A1 of the basic sine wave $\theta 1$ and the amplitude A3 of the superimposed sine wave $\theta 3$ remain unchanged from those in the initial state. That is, even if the magnitude of the amplitude A3 of the superimposed sine wave $\theta 3$ changes, the signal interval t1 is not changed by that change.

Accordingly, the correction value calculation unit 251 calculates a voltage value necessary to increase the magnitude (absolute value) of the amplitude A1 of the basic sine wave $\theta 1$ to increasingly correct time intervals of detection signals output from the BD sensor 43b as the basic correction voltage value if the signal interval this shorter than that stored in the ROM or the like in advance. Further, the correction value calculation unit 251 calculates a voltage value necessary to decrease the magnitude of the amplitude A1 of the basic sine wave $\theta 1$ to decreasingly correct the time intervals of the detection signals output from the BD sensor 43b as the basic correction voltage value if the signal interval t1 is longer than that stored in the ROM or the like in advance. Note that a relationship between an adjustment amount of the amplitude A1 of the basic sine wave $\theta 1$ and an adjustment amount of the voltage value of the basic drive voltage is stored in the ROM or the like in advance based on the experimental values of the test operation or the like.

Then, the correction value calculation unit 251 causes the mirror driving units 171 to be driven at the basic drive voltage having a voltage value equal to the calculated basic correction voltage value via the first DAC 252, the first amplifier 253 and the basic waveform shaping unit 254 to be described later. If the signal interval t2 at this time is shorter than that stored in the ROM or the like in advance, the correction value calculation unit 251 calculates a voltage value necessary to increase the magnitude (absolute value) of the amplitude A3 of the superimposed sine wave $\theta 3$ to increasingly correct time intervals of detection signals output from the BD sensor 43a as the superimposition correction voltage value.

Further, if the signal interval t2 is longer than that stored in the ROM or the like in advance, the correction value calculation unit 251 calculates a voltage value necessary to decrease the magnitude of the amplitude A3 of the superimposed sine wave $\theta 3$ to decreasingly correct the time intervals of the detection signals output from the BD sensor 43a as the superimposition correction voltage value. Note that a relationship between an adjustment amount of the amplitude A3 of the superimposed sine wave $\Theta 3$ and an adjustment amount of the voltage value of the superimposed drive voltage is stored in the ROM or the like in advance based on the experimental values of the test operation or the like.

Referring back to FIG. 18, the correction value calculation unit 251 outputs a digital signal obtained as a result of dividing the calculated basic correction voltage value by a gain used in the first amplifier 253 to be described later and indicating a voltage value smaller than the basic correction voltage value to the first DAC 252. Further, the correction value calculation unit 251 outputs a digital signal obtained as a result of dividing the calculated superimposition correction voltage value by a gain used in the second amplifier 256 to be described later and indicating a voltage value smaller than the superimposition correction voltage value to the second DAC 255.

The first DAC 252 (DC voltage generation unit) generates a DC voltage having a voltage value smaller than the basic correction voltage value. The first DAC 252 is a so-called digital-analog converter and generates a DC voltage V1 indicated by the digital signal input from the correction value calculation unit 251 and outputs it to the first amplifier 253. The second DAC 255 generates a DC voltage having a voltage value smaller than the superimposition correction voltage value. Similarly, the second DAC 255 is a so-called digital-analog converter and generates a DC voltage V5 indicated by the digital signal input from the correction value calculation unit 251 and outputs it to the second amplifier 256.

The first amplifier 253 (DC voltage amplification unit) amplifies the DC voltage V1 input from the first DAC 252 to have a voltage value equal to the basic correction voltage value. The first amplifier 253 amplifies the DC voltage V1 with a predetermined gain, generates a voltage V2 equal to the basic voltage value and outputs this to the basic waveform shaping unit 254. Similarly, the second amplifier 256 amplifies the DC voltage V5 input from the second DAC 255 to have a voltage value equal to the superimposition correction voltage value. The second amplifier 256 amplifies the DC voltage V1 with a predetermined gain, generates a voltage V6 equal to the superimposed voltage value and outputs this to the superimposition waveform shaping unit 257. Note that the gains of the first and second amplifiers 253, 256 are gains fixed in advance. The first and second DACs 252, 255 generate voltage values (DC voltages V1, V5) obtained by dividing the basic correction voltage value and the superimposition correction voltage value by the gains fixed in advance.

The basic waveform shaping unit (waveform shaping unit) 254 shapes the waveform of the DC voltage V2 amplified by the first amplifier 253 so that the DC voltage V2 varies in a basic cycle equal to the cycle of the above basic sine wave θ1. This shaped voltage is output as basic drive voltages V3, V4 to the mirror driving units 171. Similarly, the superimposition waveform shaping unit 257 shapes the waveform of the DC voltage V6 amplified by the second amplifier 256 so that the DC voltage V6 varies in a superimposition cycle which is a cycle equal to the cycle of the above superimposed sine wave θ3, i.e. ⅓ of the basic cycle. This shaped voltage is output as superimposed drive voltages V7, V8 to the mirror driving units 172.

The basic waveform shaping unit 254 includes a basic switching element 2541 and a basic switching controller 2542. The basic switching element 2541 is an element which is provided between the first amplifier 253 and the mirror driving units 171 and switches the output destination of the DC voltage V2 amplified by the first amplifier 253 between the mirror driving units 217a, 217c and the mirror driving units 217b, 217d. The basic switching controller 2542 switches the basic switching element 2541 in every cycle which is half the basic cycle.

The superimposition waveform shaping unit 257 includes a superimposition switching element 2571 and a superimposition switching controller 2572. The superimposition switching element 2571 is an element which is provided between the second amplifier 256 and the mirror driving units 172 and switches the output destination of the DC voltage V6 amplified by the second amplifier 256 between the mirror driving units 217e, 217g and the mirror driving units 217f, 217h. The superimposition switching controller 2572 switches the superimposition switching element 2571 in every cycle which is half the superimposition cycle.

Figure 19:
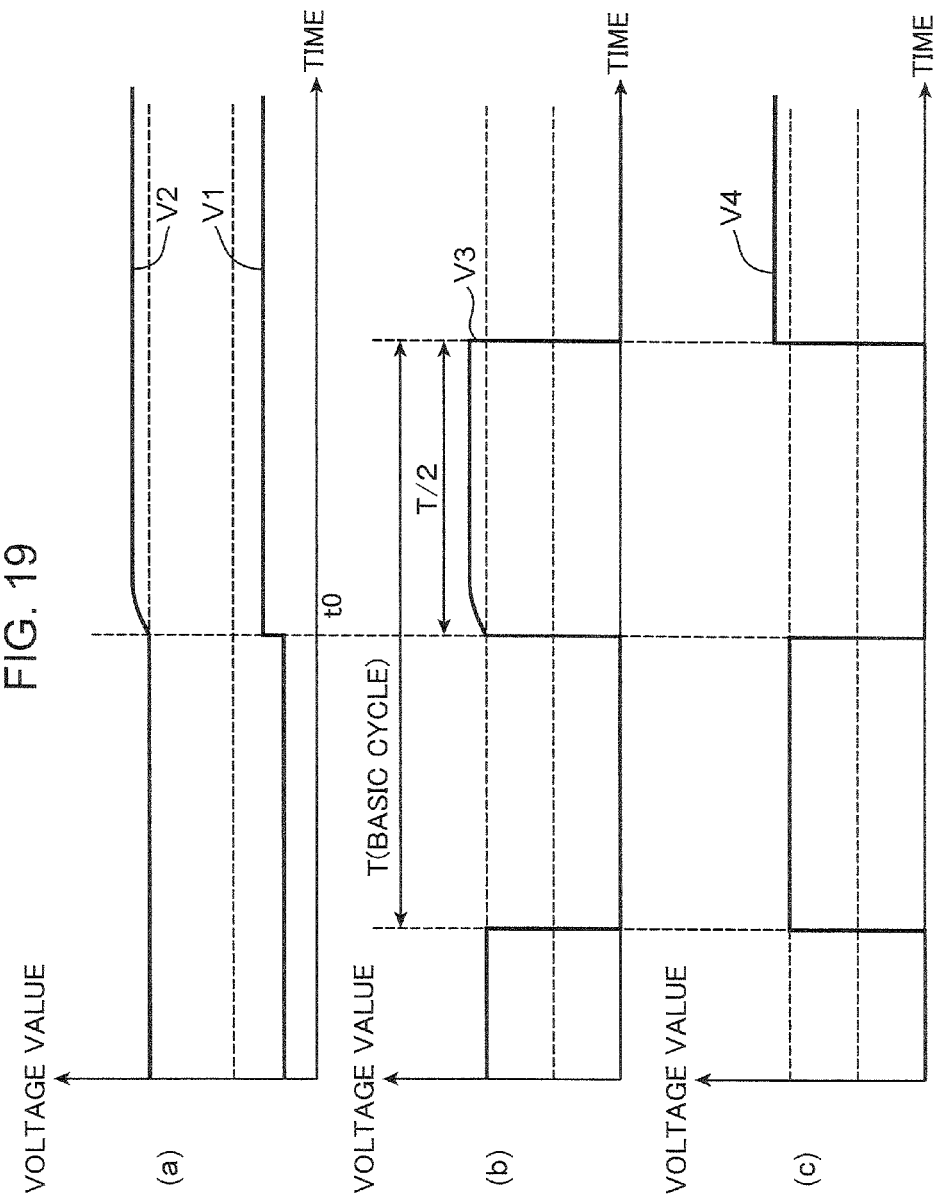
Figure 20:
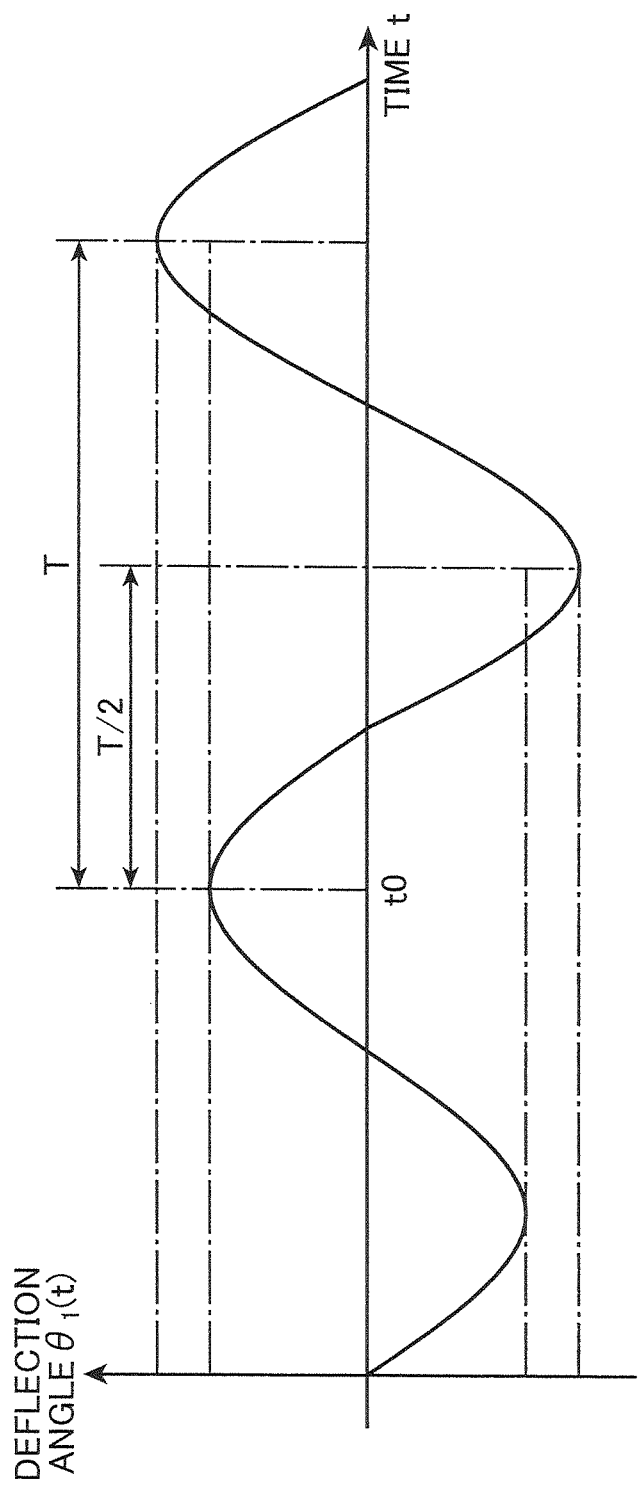
FIG. 20 is a graph showing a change in a deflection angle of a movable frame corresponding to the changes in the voltage values of the DC voltages input to the mirror driving units (first and second driving units), A section (a) of FIG. 21 is a graph showing changes in the voltage values of DC voltages input to a second amplifier and a superimposed waveform shaping unit, a section (b) is a graph showing a change in the voltage value of a DC voltage input to a mirror driving unit (third driving unit) and a section (c) is a graph showing a change in the voltage value of a DC voltage input to a mirror driving unit (fourth driving unit)

A section (a) of FIG. 19 is a graph showing a change in the voltage value of the DC voltage V1 input to the first amplifier 253 and a change in the voltage value of the DC voltage V2 input to the basic waveform shaping unit 254. A section (b) of FIG. 19 is a graph showing a change in the voltage value of the DC voltage V3 that is a DC voltage input to the mirror driving units 217a, 217c. A section (c) of FIG. 19 is a graph showing a change in the voltage value of the DC voltage V4 that is a DC voltage input to the mirror driving units 217b, 217d. FIG. 20 is a graph showing a change in the deflection angle of the movable frame 216 corresponding to the changes in the voltage values of the drive voltages V3, V4.

As shown in the section (a) of FIG. 19, when the DC voltage V1 input to the first amplifier 253 increases at time t0 based on the basic correction voltage value calculated by the correction value calculation unit 251, the waveform of the DC voltage V2 amplified by the first amplifier 253 and input to the basic waveform shaping unit 254 smoothly becomes larger. Note that the waveform of the DC voltage V2 smoothly becomes larger due to poor responsiveness of the first amplifier 253.

Thereafter, in the basic waveform shaping unit 254, the basic switching element 2541 is switched in every cycle T/2, which is half the basic cycle T, by the basic switching controller 2542 and the DC voltage V2 input to the basic waveform shaping unit 254 is alternately output between the mirror driving units 217b, 217d and the mirror driving units 217a, 217c in every cycle T/2, which is half the basic cycle T. In this way, the basic waveform shaping unit 254 shapes the waveform of the DC voltage V2 amplified by the first amplifier 253 into a rectangular wave, which varies in the basic cycle T, and outputs it as the drive voltage V3 for the mirror driving units 217a, 217c and the drive voltage V4 for the mirror driving units 217b, 217d as shown in the sections (b) and (c) of FIG. 19.

As a result, as shown in FIG. 20, the maximum deflection angle of the movable frame 216 increases and varies in the basic cycle T in accordance with the drive voltages V3, V4 supplied to the mirror driving units 217a, 217c and the mirror driving units 217b, 217d and shown in the sections (b) and (c) of FIG. 19 by the time the cycle T/2, which is half the basic cycle T, elapses from time t0.

Figure 21:
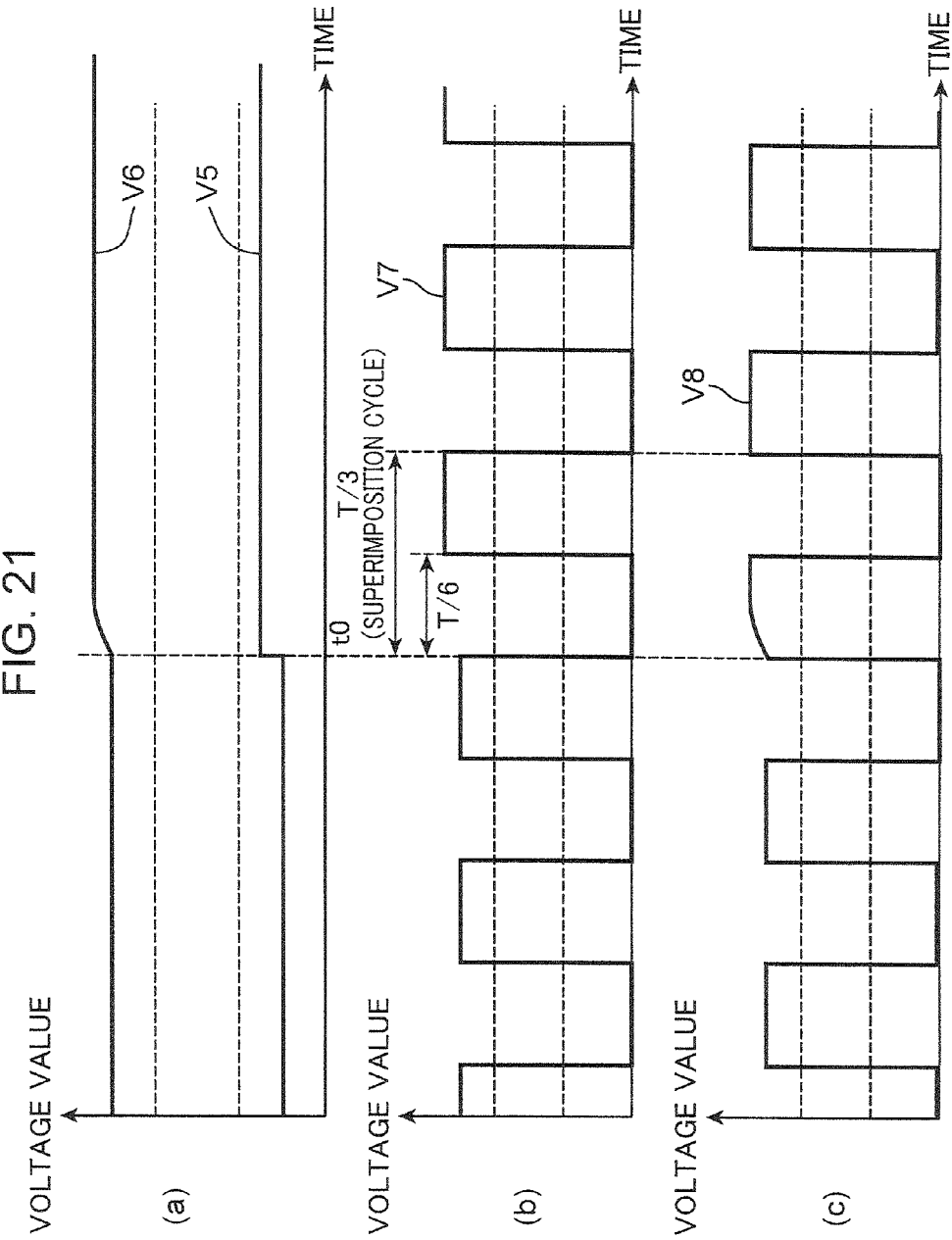
Figure 22:
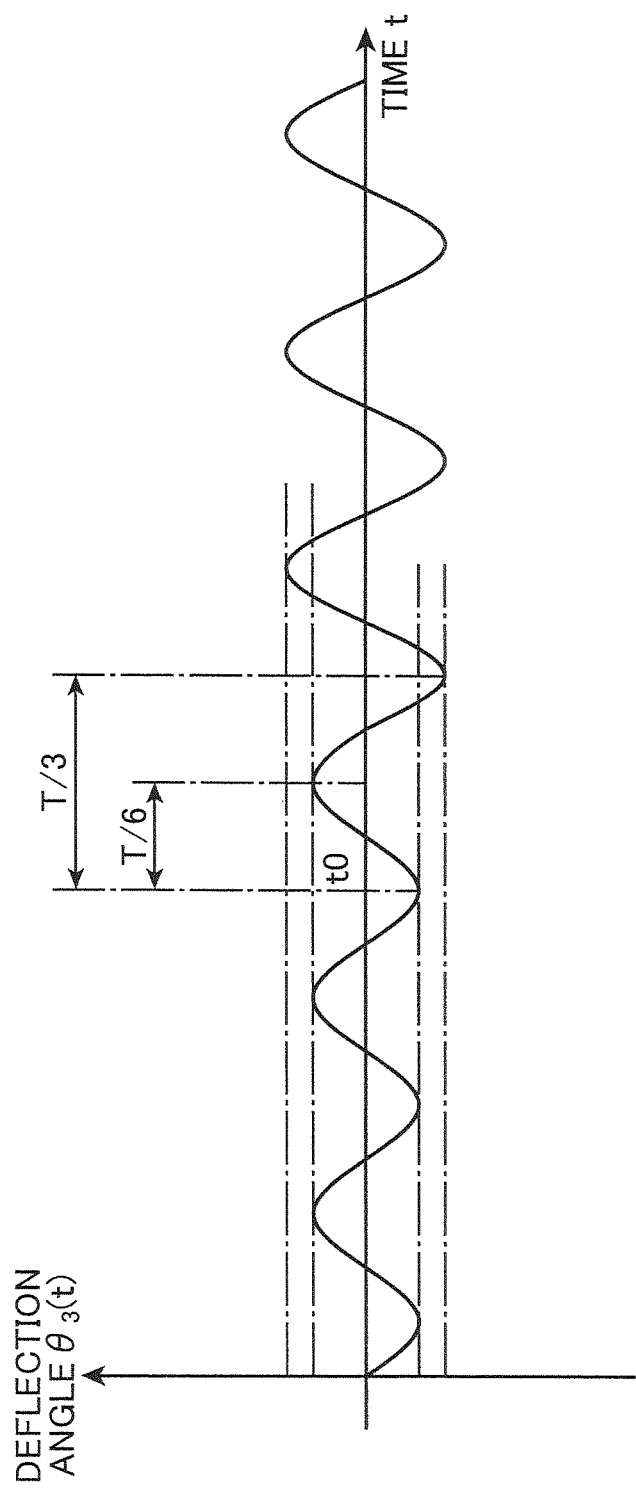
FIG. 22 is a graph showing a relative change of the deflection angle of the mirror portion with respect to the movable frame corresponding to the changes in the voltage values of the DC voltages input to the mirror driving units (third and fourth driving units)

A section (a) of FIG. 21 is a graph showing a change in the voltage value of the DC voltage V5 input to the second amplifier 256 and a change in the voltage value of the DC voltage V6 input to the superimposition waveform shaping unit 257. A section (b) of FIG. 21 is a graph showing a change in the voltage value of the DC voltage V7 that is a DC voltage input to the mirror driving units 217e, 217g. A section (c) of FIG. 21 is a graph showing a change in the voltage value of the DC voltage V8 that is a DC voltage input to the mirror driving units 217f, 217h. FIG. 22 is a graph showing a relative change in the deflection angle of the mirror portion 11A with respect to the movable frame 216 corresponding to the changes in the voltage values of the drive voltages V7, V8.

As shown in the section (a) of FIG. 21, when the DC voltage V5 input to the second amplifier 256 increases at time t0 based on the superimposition correction voltage value calculated by the correction value calculation unit 251, the waveform of the DC voltage V6 amplified by the second amplifier 256 and input to the superimposition waveform shaping unit 257 smoothly becomes larger. Note that the waveform of the DC voltage V6 smoothly becomes larger due to poor responsiveness of the second amplifier 256.

Thereafter, in the superimposition waveform shaping unit 257, the superimposition switching element 2571 is switched in every cycle T/6, which is half the superimposition cycle T/3, by the superimposition switching controller 2572 as shown in the sections (b) and (c) of FIG. 21 and the DC voltage V6 input to the superimposition waveform shaping unit 257 is alternately output between the mirror driving units 217b, 217d and the mirror driving units 217a, 217c in every cycle T/6, which is half the superimposition cycle T/3. That is, the superimposition waveform shaping unit 257 shapes the waveform of the DC voltage V6 amplified by the second amplifier 256 into a rectangular wave, which varies in the superimposition cycle T/3, and outputs it as the drive voltage V7 for the mirror driving units 217e, 217g and the drive voltage V8 for the mirror driving units 217f, 217h.

Then, as shown in FIG. 22, the relative maximum deflection angle of the mirror portion 11A with respect to the movable frame 216 increases and varies in the superimposition cycle T/3 in accordance with the drive voltages V7, V8 supplied to the mirror driving units 217e, 217g and the mirror driving units 217f, 217h and shown in the sections (b) and (c) of FIG. 21 by the time the cycle T/6, which is half the superimposition cycle T/3, elapses from time t0.

According to the configuration of the above embodiment, the DC voltage V1 having a voltage value smaller than the basic correction voltage value is generated by the first DAC 252 and the generated DC voltage V1 is amplified to have a voltage value equal to the basic correction voltage value by the first amplifier 253. The waveform of the amplified DC voltage V2 is shaped to vary like a rectangular wave in the basic cycle by the basic waveform shaping unit 254 and the AC voltages V3, V4 that vary in the basic cycle are output as the basic drive voltages to the mirror driving units 171.

Similarly, the DC voltage V5 having a voltage value smaller than the superimposition correction voltage value is generated by the second DAC 255 and the generated DC voltage V5 is amplified to have a voltage value equal to the superimposition correction voltage value by the second amplifier 256. The waveform of the amplified DC voltage V6 is shaped to vary like a rectangular wave in the superimposition cycle equal to ⅓ of the basic cycle by the superimposition waveform shaping unit 257 and the AC voltages V7, V8 that vary in this superimposition cycle are output as the superimposed drive voltages to the mirror driving units 172.

That is, in this embodiment, the inexpensive first and second DACs 252, 255 capable of generating DC voltages are employed as the configuration for generating the basic drive voltage and the superimposed drive voltage instead of an expensive oscillator capable of generating a sine wave and employed in the conventional technique. Although the configuration with an expensive amplifier capable of accurately amplifying a sine wave at each drive voltage is adopted in the conventional technique, the configuration with the inexpensive first and second amplifiers 253, 256 capable of amplifying the DC voltages with the gains fixed in advance is adopted in this embodiment. As a result, it is possible to inexpensively provide an optical scanning device with a MEMS mirror which is driven by superimposing a basic drive voltage and a superimposed drive voltage.

Further, the basic waveform shaping unit 254 is configured to include the basic switching element 2541 and the basic switching controller 2542. That is, the waveforms of the basic drive voltages output to the mirror driving units 217a, 217c and the mirror driving units 217b, 217d can be shaped into rectangular waves, which vary in the basic cycle, by a simple configuration for alternately outputting the DC voltage V2 amplified by the first amplifier 253 to the mirror driving units 217a, 217c and the mirror driving units 217b, 217d in every cycle, which is half the basic cycle.

Further, the superimposition waveform shaping unit 257 is configured to include the superimposition switching element 2571 and the superimposition switching controller 2572. That is, the waveforms of the superimposed drive voltages output to the mirror driving units 217e, 217g and the mirror driving units 217f, 217h can be shaped into rectangular waves, which vary in the superimposition cycle, by a simple configuration for alternately outputting the DC voltage V6 amplified by the second amplifier 256 to the mirror driving units 217e, 217g and the mirror driving units 217f, 217h in every cycle, which is half the superimposition cycle.

Further, the waveform shaping unit 254 can be inexpensively configured using the inexpensive switching element capable of switching a drive voltage supply path at least in two directions. Similarly, the waveform shaping unit 257 can be inexpensively configured using the inexpensive switching element capable of switching a drive voltage supply path at least in two directions.

Note that the configurations and the settings of the above embodiment shown in FIGS. 11 to 22 are merely examples and limitation to these is not intended.

For example, the correction valve calculation unit 251 may be configured to calculate the superimposition correction voltage value so as to offset a drive force of the mirror portion 11A generated by a frequency component included in the basic drive voltage shaped into a rectangular wave and having the superimposition cycle.

Figure 23:
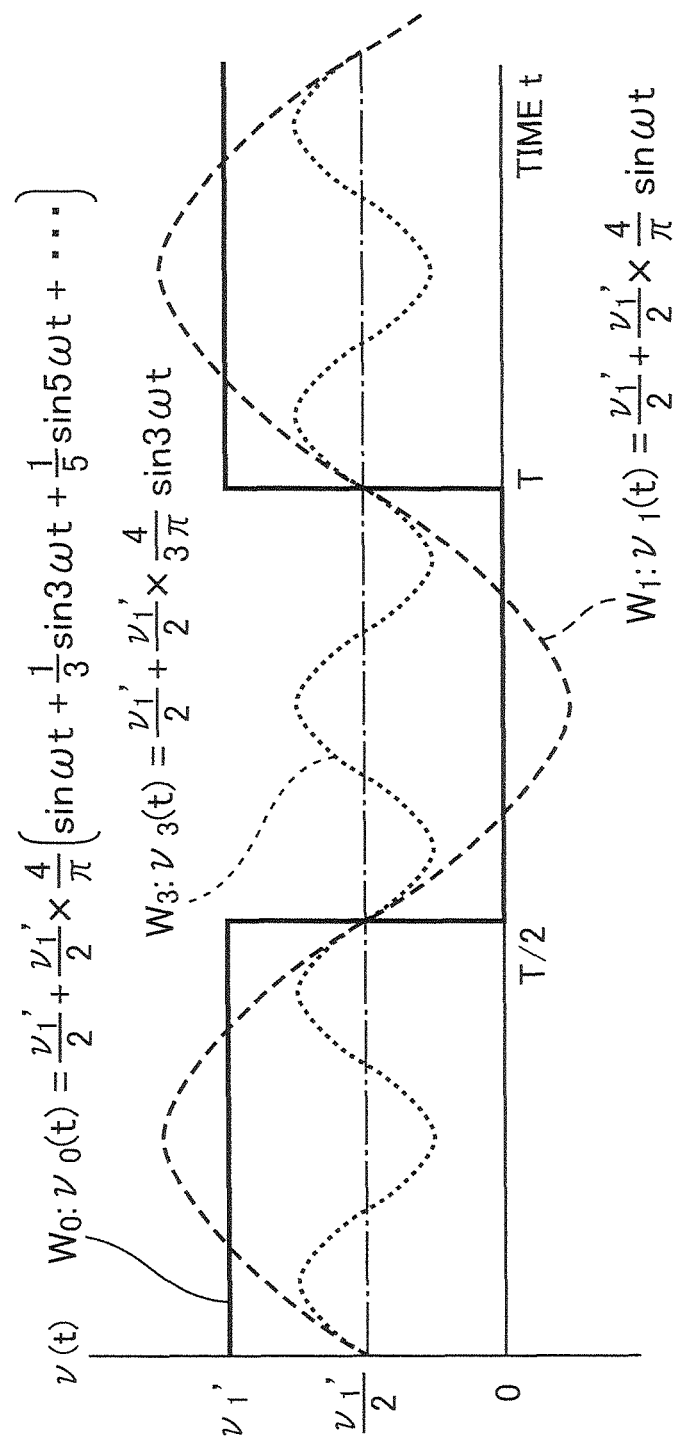
FIG. 23 is a graph showing a temporal change of a basic drive voltage shaped into a rectangular wave and a relationship between a fundamental wave and a third harmonic of the rectangular wave.

This configuration is described in detail. FIG. 23 is a graph showing a temporal change of a basic drive voltage shaped into a rectangular wave and a relationship between a fundamental wave and a third harmonic of this rectangular wave. As shown in a graph W0 of FIG. 23, a temporal change v0(t) of the basic drive voltage shaped into a rectangular wave which has a voltage value of v1' and varies in the basic cycle T can be shown by combining a plurality of sine waves whose frequencies are odd multiples of a frequency $\omega/2\pi$ of the basic sine wave such as a sine wave having a frequency of $\omega/2\pi$ (sin $\omega t$), a sine wave having a frequency of $3\omega/2\pi$ (sin $3\omega t$) and a sine wave having a frequency of $5\omega/2\pi$ (sin $5\omega t$) by the basic waveform shaping unit 254.

In FIG. 23, out of the sine waves constituting the rectangular wave of the graph W0, a fundamental wave which is a sine wave (sin $\omega t$) having a frequency $\omega/2\pi$ equal to that of the basic sine wave is shown in a graph W1 and a third harmonic which is a sine wave (sin $3\omega t$) having a frequency $3\omega/2\pi$ equal to the three-fold of the frequency of the basic sine wave is shown in a graph W3. As just described, the basic drive voltage includes the sine wave having three times as high a frequency as the basic sine wave, i.e. the frequency component of the superimposition cycle.

The since wave having three times as high a frequency as the basic sine wave has a phase opposite to the phase of the superimposed sine wave θ3 constituting the substantially triangular wave θ0 shown in FIG. 17. Thus, when the mirror driving units 171 are driven by the basic drive voltage shaped into a rectangular wave, the driving of the torsion bar 215a may be suppressed by the drive voltage due to the frequency component included in the rectangular waveform of this basic drive voltage and having the superimposition cycle.

That is, in the case of twisting the torsion bar 215a using the rectangular wave that varies in the superimposition cycle and is equal to the superimposition correction voltage value, the torsion bar 215a may not be accurately twisted due to the frequency component having the superimposition cycle and included in the basic drive voltage shaped into the rectangular wave for driving the movable frame 216 by twisting the torsion bars 215b, 215c.

Accordingly, in this configuration, the correction value calculation unit 251 calculates the superimposition correction voltage value by deleting (subtracting) the voltage value shown by the superimposed sine wave having three times as high a frequency as the basic sine wave shown by dotted line in FIG. 23.

Since the superimposition correction voltage value is calculated by the correction value calculation unit 251 to offset the drive force of the mirror portion 11A generated by a harmonic component included in the basic drive voltage shaped into the rectangular wave and having a cycle equal to the superimposition cycle according to this configuration, the torsion bar 215a can be accurately twisted.

Further, the correction value calculation unit 251 may be configured to further calculate a basic correction duty ratio which is a duty ratio indicating a ratio of a period, during which the DC voltage V2 amplified by the first amplifier 253 is output to the mirror driving units 171, out of the basic cycle. In this case, the basic waveform shaping unit 254 sets the basic drive voltage at a high level during a period corresponding to the basic correction duty ratio calculated by the correction value calculation unit 251, out of the basic cycle.

Figure 24:
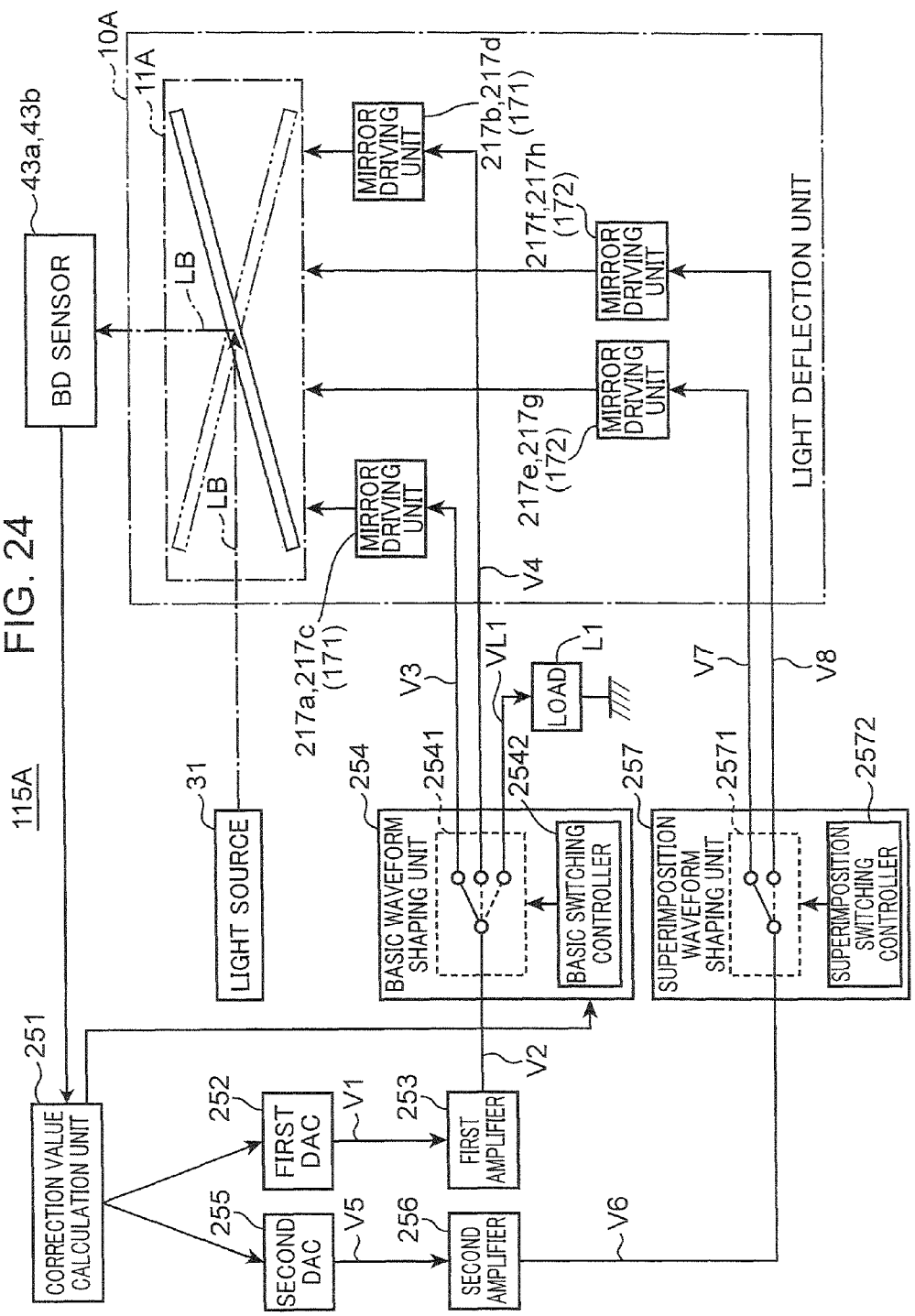
FIG. 24 is a block diagram showing the configuration of an exposure unit according to a modification 1 of the second embodiment, A section (a) of FIG. 25 is a graph showing a change in the voltage value of a DC voltage input to the mirror driving unit (first driving unit) and corresponding to a basic correction duty ratio calculated by a correction value calculation unit, a section (b) is a graph showing a change in the voltage value of a DC voltage input to a load and corresponding to the basic correction duty ratio, and a section (c) is a graph showing a change in the voltage value of a DC voltage input to the mirror driving unit (second driving unit) and corresponding to the basic correction duty ratio.

FIG. 24 is a block diagram showing an exposure unit 115A according to a modification 1 of the second embodiment. The correction value calculation unit 251 calculates a correction voltage value necessary to roughly (e.g. compensate for about 95% of a change amount) correct the magnitude of the amplitude A1 of the basic sine wave θ1 to compensate for a change in the deflection angle θ of the mirror portion 11A as a basic correction voltage value using output timings of detection signals from the BD sensors 43a, 43b as described above. Further, the correction value calculation unit 251 calculates a basic correction duty ratio to correct only the remaining magnitude of the amplitude A1 of the basic sine wave θ1 (e.g. compensating for about 5% of the change amount) and outputs it to the basic waveform shaping unit 254.

In accordance with this, the basic switching element 2541 is configured to be able to switch the output destination of the DC voltage V2 amplified by the first amplifier 253 also to a load L1 in addition to the mirror driving units 217a, 217c and the mirror driving units 217b, 217d.

Figure 25:
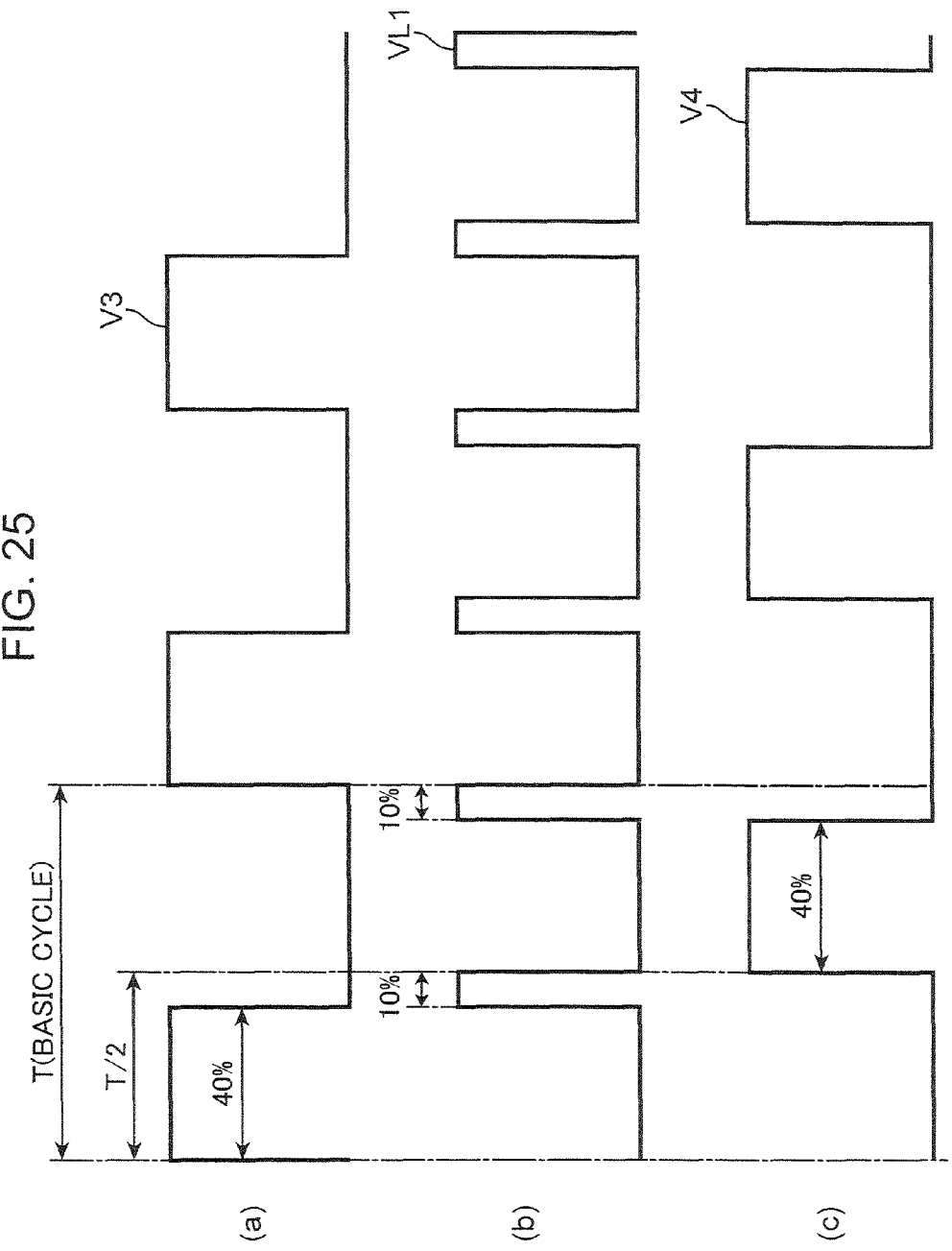

A section (a) of FIG. 25 is a graph showing a change in the voltage value of the DC voltage V3 that is a DC voltage input to the mirror driving units 217a, 217c and corresponding to the correction duty ratio calculated by the correction value calculation unit 251. A section (b) of FIG. 25 is a graph showing a change in the voltage value of a DC voltage VL1 input to the load L1 and corresponding to the basic correction duty ratio. A section (c) of FIG. 25 is a graph showing a change in the voltage value of the DC voltage V4 that is a DC voltage input to the mirror driving units 217b, 217d and corresponding to the basic correction duty ratio.

A case is assumed where the basic correction duty ratio calculated by the correction value calculation unit 251 is, for example, 40%. The basic switching controller 2542 switches the basic switching element 2541 such that the DC voltage V2 amplified by the first amplifier 253 is output to the mirror driving units 217a, 217c during a first 40% period of the basic cycle T according to the basic correction duty ratio of 40% as shown in the section (a) of FIG. 25.

Subsequently, the basic switching controller 2542 switches the basic switching element 2541 so that the DC voltage V2 amplified by the first amplifier 253 is output to the load L1 during a 10% period of the basic cycle T, which is the remaining period until the cycle T/2, which is half the basic cycle T, elapses, as shown in the section (b) of FIG. 25.

Subsequently, the basic switching controller 2542 switches the basic switching element 2541 so that the DC voltage V2 amplified by the first amplifier 253 is output to the mirror driving units 217b, 217d during a 40% period of the basic cycle T, as shown in the section (c) of FIG. 25.

Then, the basic switching controller 2542 switches the basic switching element 2541 so that the DC voltage V2 amplified by the first amplifier 253 is output to the load L1 during a 10% period of the basic cycle T, which is the remaining period until the basic cycle T elapses, as shown in the section (b) of FIG. 25.

According to this configuration, the drive voltages supplied to the mirror driving units 171 can be corrected by adjusting the application period of the basic drive voltages to the mirror driving units 171 using not only the basic correction voltage value, but also the basic correction duty ratio.

Similarly to this, the correction value calculation unit 251 may be configured to further calculate a superimposition correction duty ratio which is a duty ratio indicating a ratio of a period, during which the DC voltage V6 amplified by the second amplifier 256 is output to the mirror driving units 172, out of the superimposition cycle. In this case, the superimposition waveform shaping unit 257 sets the superimposed drive voltage at a high level during a period corresponding to the superimposition correction duty ratio calculated by the correction value calculation unit 251, out of the superimposition cycle.

Figure 26:
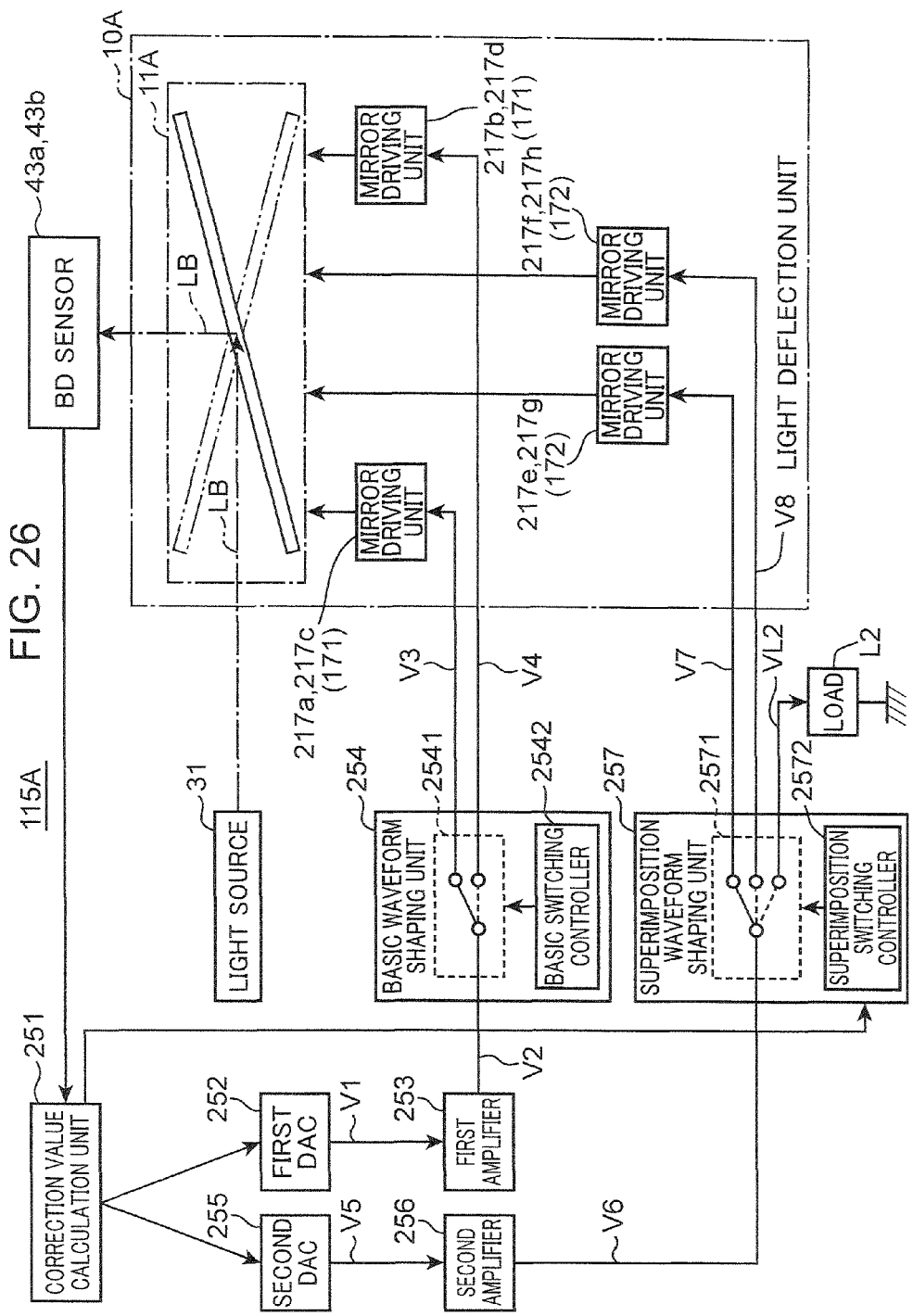
FIG. 26 is a block diagram showing the configuration of an exposure unit according to a modification 2 of the second embodiment, and A section (a) of FIG. 27 is a graph showing a change in the voltage value of a DC voltage input to the mirror driving unit (third driving unit) and corresponding to a superimposition correction duty ratio calculated by the correction value calculation unit, a section (b) is a graph showing a change in the voltage value of a DC voltage input to a load and corresponding to the superimposition correction duty ratio, and a section (c) is a graph showing a change in the voltage value of a DC voltage input to the mirror driving unit (fourth driving unit) and corresponding to the superimposition correction duty ratio.

FIG. 26 is a block diagram showing an exposure unit 115 according to a modification 2 of the second embodiment. The correction value calculation unit 251 calculates a voltage value necessary to roughly (e.g. compensate for about 95% of a change amount) correct the magnitude of the amplitude A3 of the superimposed sine wave θ3 to compensate for a change in the deflection angle θ of the mirror portion 11A as a superimposition correction voltage value using output timings of detection signals from the BD sensors 43a, 43b as described above. Further, the correction value calculation unit 251 calculates a superimposition correction duty ratio to correct only the remaining magnitude of the amplitude A3 of the superimposed sine wave θ3 (e.g. compensating for about 5% of the change amount) and outputs it to the superimposition waveform shaping unit 257.

In accordance with this, the superimposition switching element 2571 is configured to be able to switch the output destination of the DC voltage V6 amplified by the second amplifier 256 also to a load L2 in addition to the mirror driving units 217e, 217g and the mirror driving units 217f, 217h.

A section (a) of FIG. 27 is a graph showing a change in the voltage value of the DC voltage V7 that is a DC voltage input to the mirror driving units 217e, 217g and corresponding to the superimposition correction duty ratio calculated by the correction value calculation unit 251. A section (b) of FIG. 27 is a graph showing a change in the voltage value of a DC voltage VL2 input to the load L2 and corresponding to the superimposition correction duty ratio. A section (c) of FIG. 27 is a graph showing a change in the voltage value of the DC voltage V8 that is a DC voltage input to the mirror driving units 217b, 217h and corresponding to the superimposition correction duty ratio.

A case is assumed where the superimposition correction duty ratio calculated by the correction value calculation unit 251 is, for example, 40%. The superimposition switching controller 2572 switches the superimposition switching element 2571 such that the DC voltage V6 amplified by the second amplifier 256 is output to the mirror driving units 217f, 217h during a first 40% period of the superimposition cycle T/3 according to the superimposition correction duty ratio of 40% as shown in the section (c) of FIG. 27.

Subsequently, the superimposition switching controller 2572 switches the superimposition switching element 2571 so that the DC voltage V6 amplified by the second amplifier 256 is output to the load L2 during a 10% period of the superimposition cycle T/3, which is the remaining period until the cycle T/6, which is half the superimposition cycle T/3, elapses, as shown in the section (b) of FIG. 27.

Subsequently, the superimposition switching controller 2572 switches the superimposition switching element 2571 so that the DC voltage V6 amplified by the second amplifier 256 is output to the mirror driving units 217e, 217g during a 40% period of the superimposition cycle T/3, as shown in the section (a) of FIG. 27.

Then, the superimposition switching controller 2572 switches the superimposition switching element 2571 so that the DC voltage V6 amplified by the second amplifier 256 is output to the load L2 during a 10% period of the superimposition cycle T/3, which is the remaining period until the superimposition cycle T/3 elapses, as shown in the section (b) of FIG. 27.

According to this configuration, the drive voltages supplied to the mirror driving units 172 can be corrected by adjusting the application period of the superimposed drive voltages to the mirror driving units 172 using not only the superimposition correction voltage value, but also the superimposition correction duty ratio.

Note that the correction value calculation unit 251 may be configured to calculate both the basic correction duty ratio and the superimposition correction duty ratio by combining the configuration described using FIG. 24 and the sections (a), (b) and (c) of above FIG. 25 and the configuration described using FIG. 26 the sections (a), (b) and (c) of above FIG. 27. In accordance with this, the basic waveform shaping unit 254 may be configured to set the basic drive voltage at a high level during the period corresponding to the basic correction duty ratio out of the basic cycle T and the superimposition waveform shaping unit 257 may be configured to set the superimposed drive voltage at a high level during the period corresponding to the superimposition correction duty ratio out of the superimposition cycle.

In the above embodiment, the first amplifier 253 is illustrated to amplify the DC voltage V1 output from the first DAC 252 with the gain fixed in advance. Instead of this, the first amplifier 253 may be configured by an amplifier capable of amplifying a DC voltage output from the first DAC 252 with a variable gain.

In accordance with this, the first DAC 252 is configured to output a DC voltage having a voltage value (initial basic voltage value) fixed in advance and sufficiently smaller than the basic correction voltage value calculated by the correction valve calculation unit 251 to the first amplifier 253. Furthermore, the exposure unit 115A is configured to further include a basic gain setting unit 253A (block is shown by dotted line in FIG. 18) for calculating a value obtained by dividing the basic correction voltage value calculated by the correction valve calculation unit 251 by the initial basic voltage value and setting this calculated value as the gain of the first amplifier 253.

According to this configuration, the DC voltage having the initial basic voltage value that is a voltage value fixed in advance and smaller than the basic correction voltage value is generated by the first DAC 252. That is, the first DAC 252 can be simplifier and less expensive as compared with the case where the first DAC 252 is configured to generate DC voltages having various voltage values.

Further, in the above embodiment, the second amplifier 256 is illustrated to amplify the DC voltage V5 output from the second DAC 255 with the gain fixed in advance. Instead of this, the second amplifier 256 may be configured by an amplifier capable of amplifying a DC voltage output from the second DAC 255 with a variable gain.

In accordance with this, the second DAC 252 is configured to output a DC voltage having a voltage value (initial superimposed voltage value) fixed in advance and sufficiently smaller than the superimposition correction voltage value calculated by the correction valve calculation unit 251 to the second amplifier 256. Furthermore, the exposure unit 115A is configured to further include a superimposition gain setting unit 256A (block is shown by dotted line in FIG. 18) for calculating a value obtained by dividing the superimposition correction voltage value calculated by the correction valve calculation unit 251 by the initial superimposed voltage value and setting this calculated value as the gain of the second amplifier 256.

According to this configuration, the DC voltage having the initial superimposed voltage value that is a voltage value fixed in advance and smaller than the superimposition correction voltage value is generated by the second DAC 255. That is, the second DAC 255 can be simplifier and less expensive as compared with the case where the second DAC 255 is configured to generate DC voltages having various voltage values.

Further, the signal intervals t12, t21 are equal due to the symmetry of the substantially triangular wave θ0 shown by the graph G0 in FIG. 17 when the amplitude A1 of the basic sine wave θ1 and the amplitude A3 of the superimposed sine wave θ3 remain unchanged from those in the initial state. Thus, if the signal intervals t12, t21 calculated by the correction value calculation unit 251 differ, it is thought that the above symmetry is lost and there is a phase difference between the basic sine wave θ1 and the superimposed sine wave θ3.

Accordingly, the correction value calculation unit 251 may be configured to calculate a phase difference in advancing or delaying the phase of the superimposed sine wave θ3 based on an experimental value so that the calculated signal intervals t12, t21 become equal and output this phase difference to the basic switching controller 2542 or the superimposition switching controller 2572 when the calculated signal intervals t12, t21 differ. In this case, the basic switching controller 2542 shifts a switch timing of the basic switching element 2541 based on the input phase difference. Alternatively, the superimposition switching controller 2572 shifts a switch timing of the superimposition switching element 2571 based on the input phase difference.

Note that although the multi-function peripheral has been described as an example of the image forming apparatus according to the present invention in the above embodiments, the present invention is also applicable to an image forming apparatus such as a printer, a copier or a facsimile machine or an optical scanning device such as a scanner, a projector or a barcode reader.

According to the present invention as described above, it is possible to inexpensively provide an optical scanning device for correcting a drive voltage for a MEMS mirror for deflecting scanning laser light to compensate for a change in a deflection angle of the MEMS mirror and an image forming apparatus provided with the same.

The invention claimed is:

1. An optical scanning device, comprising:
 a light source;
 a MEMS mirror for deflecting laser light output from the light source;
 a driving unit for pivoting the MEMS mirror using a drive voltage which varies in a predetermined basic cycle;
 a light detection unit for receiving the laser light deflected by the MEMS mirror at a predetermined position and outputting a detection signal indicating light reception;
 a correction value calculation unit for calculating a correction voltage value, which is a voltage value used in correcting the drive voltage to compensate for a change in a deflection angle of the MEMS mirror, based on an output timing of the detection signal by the light detection unit;
 a DC voltage generation unit for generating a DC voltage having a voltage value smaller than the correction voltage value;
 a DC voltage amplification unit for amplifying the DC voltage generated by the DC voltage generation unit to have a voltage value equal to the correction voltage value; and
 a waveform shaping unit for shaping the waveform of the DC voltage amplified by the DC voltage amplification unit so that the DC voltage varies in the basic cycle and outputting the shaped DC voltage as the drive voltage to the driving unit.

2. An optical scanning device according to claim 1, wherein:
 the driving unit includes a first driving unit and a second driving unit for driving the MEMS mirror in directions opposite to each other according to the drive voltage; and
 the waveform shaping unit shapes the waveforms of the drive voltages output to the first and second driving units into rectangular waves which respectively vary in the basic cycle by alternately outputting the DC voltage amplified by the DC voltage amplification unit to the first and second driving units in every cycle which is half the basic cycle.

3. An optical scanning device according to claim 2, wherein the waveform shaping unit includes:
   a switching element provided between the DC voltage amplification unit and the driving unit and configured to switch the output destination of the DC voltage amplified by the DC voltage amplification unit between the first and second driving units; and
   a switching controller for switching the switching element in every cycle which is half the basic cycle.

4. An optical scanning device according to claim 1, wherein:
   the correction value calculation unit further calculates a correction duty ratio which is a duty ratio indicating a ratio of a period, during which the DC voltage amplified by the DC voltage amplification unit is output to the driving unit, out of the basic cycle; and
   the waveform shaping unit sets the drive voltage at a high level during a period corresponding to the correction duty ratio calculated by the correction value calculation unit out of the basic cycle.

5. An optical scanning device according to claim 1, wherein:
   the DC voltage amplification unit is composed of an amplifier for amplifying the DC voltage generated by the DC voltage generation unit with a variable gain;
   the DC voltage generation unit generates a DC voltage having a voltage value fixed in advance and smaller than the correction voltage value; and
   the optical scanning device further comprises a gain setting unit for setting a value obtained by dividing the correction voltage value by the voltage value fixed in advance as the variable gain.

6. An optical scanning device according to claim 1, wherein:
   the DC voltage amplification unit is composed of an amplifier for amplifying the DC voltage generated by the DC voltage generation unit with a variable gain; and
   the DC voltage generation unit generates a DC voltage having a voltage value obtained by dividing the correction voltage value by the gain fixed in advance.

7. An optical scanning device according to claim 1, wherein:
   the driving unit pivots the MEMS mirror using a basic drive voltage as a drive voltage which varies in the basic cycle and a superimposed drive voltage which varies in a superimposition cycle shorter than the basic cycle;
   the correction value calculation unit calculates a basic correction voltage value which is a voltage value used in correcting the basic drive voltage and a superimposition correction voltage value which is a voltage value used in correcting the superimposed drive voltage to compensate for a change in the deflection angle of the MEMS mirror based on the output timing of the detection signal by the light detection unit;
   the DC voltage generation unit is a basic voltage generation unit for generating a DC voltage having a voltage value smaller than the basic correction voltage value;
   the DC voltage amplification unit is a basic voltage amplification unit for amplifying the DC voltage generated by the basic voltage generation unit to have a voltage value equal to the basic correction voltage value;
   the waveform shaping unit is a basic waveform shaping unit for shaping the waveform of the DC voltage amplified by the basic voltage amplification unit into a rectangular wave which varies in the basic cycle and outputting the shaped DC voltage as the basic drive voltage to the driving unit; and
   the optical scanning device further comprises:
   a superimposed voltage generation unit for generating a DC voltage having a voltage value smaller than the superimposition correction voltage value;
   a superimposed voltage amplification unit for amplifying the DC voltage generated by the superimposed voltage generation unit to have a voltage value equal to the superimposition correction voltage value; and
   a superimposition waveform shaping unit for shaping the waveform of the DC voltage amplified by the superimposed voltage amplification unit into a rectangular wave which varies in the superimposition cycle and outputting the shaped DC voltage as the superimposed drive voltage to the driving unit.

8. An optical scanning device according to claim 7, further comprising:
   a movable frame;
   a fixed frame provided outside the movable frame;
   a first torsion bar having a first torsion axis and configured to support the MEMS mirror on the movable frame in a state rotatable by a torsional movement about the first torsion axis; and
   a second torsion bar having a second torsion axis coaxial with the first torsion axis and configured to support the movable frame on the fixed frame in a state rotatable by a torsional movement about the second torsion axis;
   wherein:
   the driving unit pivots the MEMS mirror by causing the second torsion bar to make the torsional movement using the basic drive voltage to rotate the movable frame and causing the first torsion bar to make the torsional movement using the superimposed drive voltage to rotate the MEMS mirror; and
   the correction value calculation unit calculates the superimposition correction voltage value to offset a drive force of the MEMS mirror generated by a frequency component included in the basic drive voltage shaped into the rectangular wave and having the superimposition cycle.

9. An optical scanning device according to claim 8, wherein:
   the driving unit includes a first driving unit and a second driving unit for driving the movable frame in directions opposite to each other according to the basic drive voltage, a third driving unit for driving the MEMS mirror in the same direction as the first driving unit according to the superimposed drive voltage and a fourth driving unit for driving the MEMS mirror in the same direction as the second driving unit according to the superimposed drive voltage;
   the basic waveform shaping unit shapes the waveforms of the basic drive voltages output to the first and second driving units respectively into rectangular waves which vary in the basic cycle by alternately outputting the DC voltage amplified by the basic voltage amplification unit to the first and second driving units in every cycle which is half the basic cycle; and
   the superimposition waveform shaping unit shapes the waveforms of the superimposed drive voltages output to the third and fourth driving units respectively into rectangular waves which vary in the superimposition cycle by alternately outputting the DC voltage amplified by the superimposed voltage amplification unit to the third and fourth driving units in every cycle which is half the superimposition cycle.

10. An optical scanning device according to claim 9, wherein the basic waveform shaping unit includes:
- a basic switching element provided between the basic voltage amplification unit and the driving unit and configured to switch the output destination of the DC voltage amplified by the basic voltage amplification unit between the first and second driving units; and
- a basic switching controller for switching the basic switching element in every cycle which is half the basic cycle.

11. An optical scanning device according to claim 9, wherein the superimposition waveform shaping unit includes:
- a superimposition switching element provided between the superimposed voltage amplification unit and the driving unit and configured to switch the output destination of the DC voltage amplified by the superimposed voltage amplification unit between the third and fourth driving units; and
- a superimposition switching controller for switching the superimposition switching element in every cycle which is half the superimposition cycle.

12. An optical scanning device according to claim 7, wherein:
- the correction value calculation unit further calculates a basic correction duty ratio indicating a ratio of a period, during which the DC voltage amplified by the basic voltage amplification unit is output to the driving unit, out of the basic cycle; and
- the basic waveform shaping unit sets the basic drive voltage at a high level during a period corresponding to the basic correction duty ratio calculated by the correction value calculation unit out of the basic cycle.

13. An optical scanning device according to claim 7, wherein:
- the correction value calculation unit further calculates a superimposition correction duty ratio indicating a ratio of a period, during which the DC voltage amplified by the superimposed voltage amplification unit is output to the driving unit, out of the superimposition cycle; and
- the superimposition waveform shaping unit sets the superimposed drive voltage at a high level during a period corresponding to the superimposition correction duty ratio calculated by the correction value calculation unit out of the superimposition cycle.

14. An optical scanning device according to claim 7, wherein:
- the basic voltage amplification unit is composed of an amplifier for amplifying the DC voltage generated by the basic voltage generation unit with a gain fixed in advance; and
- the basic voltage generation unit generates a DC voltage having a voltage value obtained by dividing the basic correction voltage value by the gain fixed in advance and used in the basic voltage amplification unit.

15. An optical scanning device according to claim 7, wherein:
- the superimposed voltage amplification unit is composed of an amplifier for amplifying the DC voltage generated by the superimposed voltage generation unit with a gain fixed in advance; and
- the superimposed voltage generation unit generates a DC voltage having a voltage value obtained by dividing the superimposition correction voltage value by the gain fixed in advance and used in the superimposed voltage amplification unit.

16. An optical scanning device according to claim 7, wherein:
- the basic voltage amplification unit is composed of an amplifier for amplifying the DC voltage generated by the basic voltage generation unit with a variable gain;
- the basic voltage generation unit generates a DC voltage having an initial basic voltage value which is a voltage value fixed in advance and smaller than the basic correction voltage value; and
- the optical scanning device further comprises a basic gain setting unit for setting a value obtained by dividing the basic correction voltage value by the initial basic voltage value as the variable gain used in the basic voltage amplification unit.

17. An optical scanning device according to claim 7, wherein:
- the superimposed voltage amplification unit is composed of an amplifier for amplifying the DC voltage generated by the superimposed voltage generation unit with a variable gain;
- the superimposed voltage generation unit generates a DC voltage having an initial superimposed voltage value which is a voltage value fixed in advance and smaller than the superimposition correction voltage value; and
- the optical scanning device further comprises a superimposition gain setting unit for setting a value obtained by dividing the superimposition correction voltage value by the initial superimposed voltage value as the variable gain used in the superimposed voltage amplification unit.

18. An image forming apparatus, comprising:
- an optical scanning device according to claim 1, and
- an image forming unit including a photoconductor on which a latent image is to be formed by the optical scanning device and configured to form an image corresponding to the latent image on a sheet.

* * * * *